US010475275B1

(12) United States Patent
Halvorson

(10) Patent No.: US 10,475,275 B1
(45) Date of Patent: Nov. 12, 2019

(54) GAMING SYSTEM WITH LAYERED AWARD WHEELS

(71) Applicant: ADP GAUSELMANN GMBH, Espelkamp (DE)

(72) Inventor: Michael Charles Halvorson, Las Vegas, NV (US)

(73) Assignee: ADP GAUSELMANN GMBH, Espelkamp (DE)

( * ) Notice: Subject to any disclaimer, the term of this patent is extended or adjusted under 35 U.S.C. 154(b) by 0 days.

(21) Appl. No.: 16/153,154

(22) Filed: Oct. 5, 2018

(51) Int. Cl.
*A63F 13/00* (2014.01)
*G07F 17/32* (2006.01)

(52) U.S. Cl.
CPC ...... *G07F 17/3213* (2013.01); *G07F 17/3209* (2013.01); *G07F 17/3216* (2013.01); *G07F 17/3244* (2013.01)

(58) Field of Classification Search
CPC ... G07F 17/3267; G07F 17/34; G07F 17/3211
See application file for complete search history.

(56) References Cited

U.S. PATENT DOCUMENTS 6,705,944 B2 3/2004 Luciano
7,625,278 B2 12/2009 Paulsen et al.
7,708,628 B2 * 5/2010 Baerlocher ............. G07F 17/34 463/16
9,552,698 B2 * 1/2017 Berman ................ G07F 17/326
2005/0026673 A1 * 2/2005 Paulsen ............... G07F 17/3267 463/16
2005/0119043 A1 * 6/2005 Berman .............. G07F 17/3211 463/20
2014/0194183 A1 * 7/2014 Pierer ..................... G07F 17/34 463/20
2016/0300454 A1 * 10/2016 Uss ........................ G07F 17/34

* cited by examiner

*Primary Examiner* — James S. McClellan
*Assistant Examiner* — Kevin M Carter
(74) *Attorney, Agent, or Firm* — Resolute Legal PLLC

(57) ABSTRACT

Systems, methods, and computer program products for gaming systems are disclosed. A gaming system performs operations, including randomly determining and displaying game symbols of a first feature of a game. The operations further include determining that the game symbols include an initiator symbol and one or more activator symbols. The operations further include determining a quantity of the activator symbols. The operations further include initiating a quantity of second feature displays corresponding to the quantity of activator symbols. The operations further include randomly determining and displaying additional game symbols of a second feature of the game. The operations further include determining that the symbols of second feature correspond to awards and converting the symbols into the awards.

20 Claims, 8 Drawing Sheets

GAMING SYSTEM WITH LAYERED AWARD WHEELS

FIELD

The present disclosure relates to gaming systems.

BACKGROUND

Gaming systems accept wagers from players in exchange for an opportunity to win awards or prizes. Current gaming systems combine various specialized computing technologies to provide specialized systems adapted to gain the attention of players and to keep them engaged with the gaming systems. To retain players' interest, gaming systems that offer new and unconventional functionality are needed.

SUMMARY

Implementations consistent with the present disclosure provide systems and methods for gaming systems. In various implementations of the systems and methods, a first feature of a gaming system randomly generates symbols of a first feature outcome, and displays such symbols using a game display. The first feature of the game can be, for example, a slot machine-type game. The gaming system evaluates the displayed symbols of the first feature outcome and identifies predetermined symbols or predetermined combinations of the symbols that, in some implementations, the gaming system converts into one or more awards for a player. In accordance with aspects of the present disclosure, the gaming system also evaluates the first feature outcome and determines whether it includes one or more predetermined initiator symbols and one or more predetermined activator symbols corresponding to the initiator symbol. When the gaming system determines that the first feature outcome includes at least one initiator symbol and at least one activator symbol, the gaming system activates a second feature for the player. In accordance with aspects of the present disclosure, the gaming system generates or activates a quantity of second feature displays corresponding to the quantity of activator symbols displayed in the first feature outcome. When the second features activates, the gaming system randomly generates and displays symbols as one or more outcomes of the second feature, which the gaming system evaluates and converts into one or more awards for the player.

In a non-limiting example, the second feature displays are virtual award wheels (e.g., a cone shaped wheel, a cylindrical wheel, a roulette-type wheel, or the like). The gaming system can dynamically generate and display the second feature displays when game symbols displayed on a first feature of the game (e.g., reels of a slot machine) include at least one initiator symbol and at least one activator symbol. As described above, the quantity of award wheels displayed or activated corresponds to a quantity of activator symbols displayed by the first feature of the game. For example, if the first feature of the game display includes N symbol display locations (e.g., N=15), of which one (1) symbol display position includes an initiator symbol, the remaining N−1 symbol display position may include activator symbols (e.g., 15−1=14). Accordingly, in the present example, the second feature of the game may generate or activate a number quantity of second feature displays between 1 and N−1 (e.g., between 1 and 14).

In another non-limiting example, the second feature displays are award wheels that are statically displayed and selectively activated when game symbols displayed by the first feature of the game (e.g., reels of a slot machine) include at least one initiator symbol and at least one activator symbol. In some implementations, the second feature displays are virtual award wheels or mechanical award wheels. Similar to the above example, the quantity of award wheels selected and activated is based on the number of activator symbols displayed in the first feature of the game. For example, the gaming system may initially display three (3) inactive award wheel displays. When the first feature of the game displays at least one initiator symbol and two (2) activator symbols (i.e., N=2), the gaming system activates two of the award wheels in the second feature of the game. And, when the gaming system generates and displays at least one initiator symbol and three (3) or more activator symbols (i.e., N>3), the gaming system activates all three of wheel award displays.

In some implementations, the second feature displays (e.g., award wheels) are independent, and the gaming system determines an award by combining (e.g., adding or subtracting) values of the different active second feature displays. In some implementations, the second feature displays are linked such that an outcome of one of the second features modifies (e.g., multiplies or divides) an outcome of one or more of the other second features. In various implementations, the second feature displays are indexed such that a common pay line indicates results on all of the second feature displays, and the gaming systems determines an award for the player by selectively combining results displayed by all the second feature displays. For example, the second feature displays can be layered or stacked award wheels. In some implementations, the layered or stacked award wheels have progressively decreasing diameters such an annular symbols display areas of each award wheel are visible to the player.

As described above and set forth in greater detail below, gaming systems in accordance with aspects of the present disclosure provide a specialized computing device including non-conventional hardware and software that improve upon the existing technology of human-computer interfaces by providing unconventional functionality of generating display outputs that dynamically generate or selectively activate varying number of second feature displays based on a number of activator symbols in a first feature of the game and, further, convert the symbols obtained through such second feature outcomes into awards. Doing so improves the operation of the gaming systems for their specialized purpose by reducing player disappointment with first feature of the game outcomes, enhancing player excitement through a variable second feature of the game, thereby increasing player engagement with the gaming system.

BRIEF DESCRIPTION OF THE DRAWINGS

The accompanying drawings, which are incorporated in and constitute a part of this specification, illustrate the present teachings and together with the description, serve to explain the principles of the disclosure.

DETAILED DESCRIPTION

The present disclosure relates to gaming systems and, more specifically, systems and methods for gaming systems. As described previously, various implementations of gaming systems and methods consistent with the present disclosure provide a game including a first feature (e.g., a slot machine feature) that randomly generates and displays symbols that may include an initiator symbol and activator symbols corresponding to the initiator symbol. When the symbols generated by first feature include at least one initiator symbol and at least one activator symbol, the gaming system generates or activates a quantity of second feature displays (e.g., award wheels) corresponding to the quantity of activator symbols displayed by the first feature.

Gaming System Platform

Figure 1:
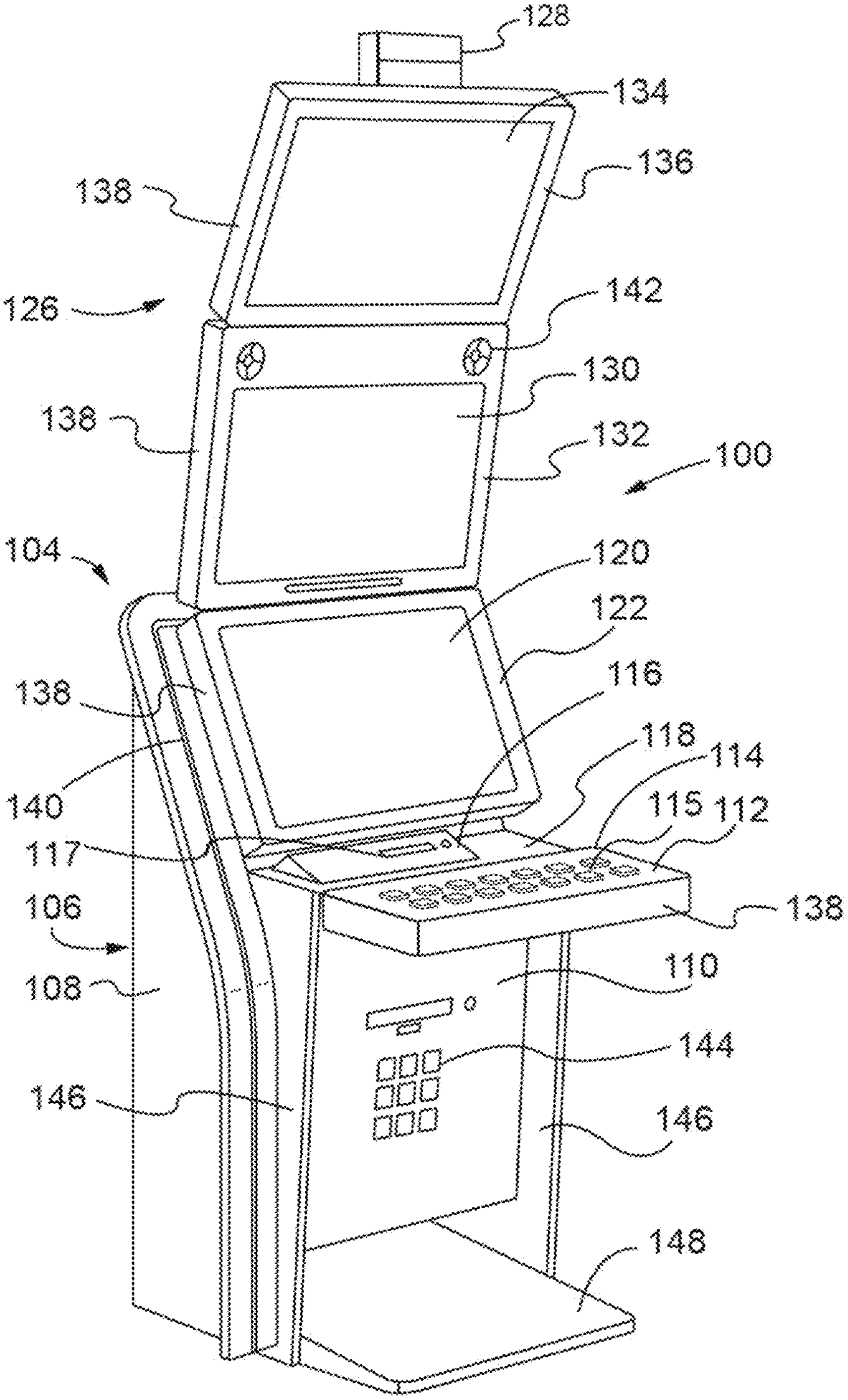
FIG. 1 shows a perspective view illustrating an example gaming system in accordance with aspects of the present disclosure.

FIG. 1 shows a perspective view illustrating an example of gaming system 100 in accordance with aspects of the present disclosure. The gaming system 100 may be referred to as a slot machine and, as illustrated, is housed in a cabinet 104 (e.g., a housing). The cabinet 104 may function to securely protect local control system, technology components, and provide support for game display(s) and player input and output interactions with the gaming system 100, such as describe herein below. In implementations, the cabinet is structured and configured such that a player can operate and play the gaming system 100 while standing or sitting.

The cabinet 104 can include a lower cabinet body portion 106, which includes a pair of cabinet side panels 108 (only one of which is viewable in the perspective view of FIG. 1), a front panel 110, and a rear panel (not shown). Additionally, the gaming system 100 can include a base panel (not shown) and a top panel surface (not shown) supporting a player interaction area 112 and a display device 120. The cabinet panels 108 and 110 (as well as the base panel and the top panel surface) may be interconnected along their edges and cooperate to form the cabinet 104, which encloses and houses components of the gaming system 100, as can be seen in FIG. 1.

While the example cabinet 104 is depicted as having a particular shape, structure, and organization, it should be appreciated that a wide variety of cabinet enclosure sizes, shapes, and designs are possible for the gaming system 100. For example, the cabinet panels 108 and 110 (as well as the base panel and the top panel surface) may be combined into fewer elements or divided into additional elements. Additionally, the positions of the displays (e.g., first display device 120) and input/output devices can be reorganized and/or relocated with respect to one another.

The player interaction area 112 can include various input and output (I/O) devices through which a player can interact with the gaming system 100 in various ways to direct the wagering and game play activities and preferences. In some implementations, the player interaction area 112 may be a planar structure (e.g., a shelf or table-like structure) supported on the front top side of cabinet 104 on a panel structure that extends horizontally outwardly from the cabinet 104 in the direction of the player. The player interaction area 112 may contain player input and output structures, including a player control area 114, a player value acceptor and dispenser area 116, and player convenience input area 118.

The player control area 114 includes one or more player input devices 115 through with which players may interact with the gaming system 100 so as to direct game play. The player input devices 115 may include various player controls devices, such a keyboard, a keypad, a touchscreen displays, a voice input/recognition device, a button, a switched, a knobs, etc. For example, player input devices 115 may include game selection button(s) (e.g., in implementations where more than one game is provided in a single gaming system 100); gaming denomination value selection buttons (e.g., in implementations where one or more wagering denomination value is accommodated); wager selection buttons (e.g., in implementations involving where a selection of wager values are offered); pay line selection buttons (e.g., in game implementations that enable selection of multiple pay lines); a reel spin button (e.g., in implementations where a player initiate one or more reels to spin in a game); a repeat last bet button (e.g., for conveniently repeating a last game's preference and wager selections in a new game); a cash-out button (e.g., for player extraction of gaming system credits); an attendant call button; and gaming system information buttons (e.g., for selectively displaying pay tables, game rules, or other game-related information).

Although the gaming system 100 illustrated in FIG. 1 shows the player input devices 115 of the player control area 114 as physical controls (e.g., buttons), it is understood that in some implementations, a player's gaming control interactions could be made by either the physical controls or functionally equivalent "soft" controls (e.g., soft buttons) located on the gaming display and activated by player touch (e.g., touch screen interfaces), or a combination of both arrangements.

The player value acceptor and dispenser area 116 may include one or more value acceptance and distribution devices 117 that enable the player to interact with the gaming system 100 and to risk or otherwise place a wager (a monetary value) on one or more outcomes of a game. For example, using the value acceptance and value distribution devices 117, a player can supply monetary value to the gaming system 100. Additionally, the value acceptance and distribution devices 117 may return winnings to the player via some form of value distribution.

In some implementations, the value acceptance and distribution devices 117 may accept any one or more of the following from a player to establish a gaming credit balance: coins, bills, tokens, tickets/vouchers, player ID cards, credit cards, or other suitable forms of value. Thus, if the gaming system 100 accepts coins and bills, the value acceptance and distribution devices 117 may comprise a currency bill validator and a coin validator. Likewise, if the gaming system 100 accepts tickets, the value acceptance and distribution devices 117 may comprise a ticket acceptor that receives tickets or vouchers representing some monetary value. The ticket acceptor may include a bar code reader, or other appropriate code reader, for reading the encoded value contained by the player's ticket or voucher. In some implementations, value acceptance and distribution devices 117 can accept more than one type of value. In some implementations, the player value acceptor and dispenser area 116 may include multiple different value acceptance and distribution devices 117 that accept different types of value from players.

Upon receipt of some type of value from the player, the value acceptance and distribution devices 117 of the player value acceptor and dispenser area 116 can perform validation on the player supplied value using appropriate hardware readers (e.g., determining that the currency bills/coins/tokens are genuine or the ticket/voucher is genuine). If the validation result is positive on player supplied value, the value acceptance and distribution devices 117 can generate a signal to a processor of the gaming system 100 that establishes a gaming credit balance for playing one or more games on gaming system 100.

In some implementations, the value acceptance and distribution devices 117 dispenses a monetary value, or a representation thereof, from the gaming system 100 when a player chooses to "cash out" the gaming credit balance (e.g., remove value from the gaming system 100). The player can cash out at any suitable time. When a player cashes out the value contained on a credit meter (not shown) of gaming system 100, a processor of gaming system 100 may cause a printer included in the value acceptance and distribution devices 117 to print and dispense a coded ticket or voucher through a dispensing slot to the player. The coded ticket or voucher may be a bar-coded ticket or any other code (e.g., PDF417 coding or quick response (QR) coding). This ticket can then be used as value input at another gaming system, or converted to currency at a conveniently located kiosk or cashier counter located near the gaming system. Alternatively, the processor of gaming system 100 may cause a currency bill dispenser or a coin dispenser included in the value acceptance and distribution devices 117 to dispense the value contained on the credit meter of gaming system 100.

Various combinations of the above value acceptance and value distribution arrangements are possible. The gaming system 100 may include other value acceptance and value distribution mechanisms in the player value acceptor and dispenser area 116. For example, the value acceptance and distribution devices 117 may include a magnetic strip or chip card reader/writer 227 in order to accept value from and transfer value to a magnetic strip or an embedded chip card. In other implementations, the value acceptance and distribution devices 117 may include hardware for transferring (and receiving) non-traditional currencies to players such as digital currencies (e.g., bitcoin).

In some implementations, the value acceptance and distribution devices 117 may include a card reader/writer 227 that accepts and reads any of a variety of magnetic strip or imbedded chip smart cards that convey machine readable information. The card reader/writer 227 reads inserted cards, in the case of wagering, for the credit information of the player for cashless gaming. The card reader/writer 227 may, for player loyalty programs, utilize the information on the card to identify the player account associated with the card so the gaming activity on the gaming system 100 may be associated with the player account. Additionally, a numeric or alphanumeric keypad (not shown) may be provided adjacent to the card reader/writer 227 slot that enables player entry of a personal identification number or the like for secure access to card information.

In some implementations, a player convenience input area 118 may be included in the gaming system 100, as is shown in FIG. 1. In various implementations, player convenience input area 118 may have a variety of features and functions depending on the jurisdictional deployment of the gaming system 100. In some implementations, the player convenience input area 118 may house a magnetic strip card reader (not illustrated), integrated circuit chip card reader (not illustrated), or both, for reading cards associated with a player loyalty program. Player loyalty programs, also referred to as player tracking systems, provide magnetic strip or chip cards to players for insertion into the gaming system 100 during play. These player loyalty/player tracking cards may be associated with a player account and are utilized by the card-issuing entity to monitor, or track a player's gaming activity and build loyalty through player rewards of a variety of types. The player convenience input area 118 may include an input mechanism such as input buttons so that a player may input a personal identification number or other require player information associated with the player tracking card. Further, the input mechanism may also include a small display utilized to communicate player information to the player such as the player's current loyalty rewards.

In certain implementations, the player convenience input area 118 may include player convenience features such as a pocket for storage that allows players to store their personal items such as a mobile phone. The gaming system 100 may include one or more universal serial bus (USB) ports that enables a player to charge their electronics or connect to services such as the Internet or food service. Further, player convenience input area 118 of the gaming system 100 may include buttons to request food or drink service if the gaming system is located in an establishment that has food and drink service. The gaming system 100 may be connected to a local or wide area network such that selection of the requested food or drink service may alert the establishment's hospitality staff to deliver the requested service directly to the gaming system 100.

The layout of the player control area 114, the player value acceptor and dispenser area 116, and the player convenience input area 118 in gaming system 100 may be arranged differently than those disclosed and illustrated herein. The selections and arrangement of input locations on the cabinet 104 may vary based on the game buttons, the type of value wagered, and the player conveniences utilized in the deployment configuration of gaming system 100.

With continuing reference to FIG. 1, the lower cabinet body portion 106 supports the display device 120 in some implementations consistent with the present disclosure. For example, the display device 120 can be mounted atop or flush with a top panel surface of the lower cabinet body portion 106.

The display device 120 can use any current display technology, such as a cathode-ray tube (CRT) technology, liquid crystal display (LCD) technology, or light-emitting diode (LED) technology. For example, the display device 120 can be a 27-inch LCD display mounted vertically (e.g., portrait orientation) or horizontally (e.g., landscape orientation) with respect to its long axis. Further, the display device 120 can be mounted within and framed by first display frame 122 which is, in turn, mounted upon lower cabinet body portion's 106 top panel surface. In this manner, the display device 120 is both surrounded and secured within the first display frame 122 and raised above the cabinet's top panel surface. In some implementations, display device 120 may be fitted with a transparent touch sensitive overlay for sensing player touch inputs into the gaming system 100. The touch sensitive overlays can communicate with a processor of gaming system 100 to enable the player to interact with the game.

In some implementations, the display device 120 may be the sole display provided by the gaming system 100. For example, a single first game display 120 may span the one or more portions of the cabinet 104 (e.g., lower body cabinet portion 106 and upper body cabinet body portion 126, described below) in place of other display devices (e.g., display devices 130 and 134, described below).

Dependent upon the particular gaming system housing style, a variety of other display devices and display technologies may be utilized in combination with display device 120. For example, the gaming system 100 may have one or more display devices in addition to the display device 120. For example, the cabinet 104 may support a player tracking device having a player tracking display which displays various information to the player regarding the player's status. The cabinet 104 may also support other game-related displays such as the wager display and the gaming credit balance display. These additional game-related displays may be separate display devices or may be displayed on any one or more of the display devices (e.g., display device 120, or display devices 130 and 134, described below).

The lower cabinet body portion 106 can be further constructed to support the upper cabinet body portion 126. The upper cabinet body portion 126 may be comprised of an upwardly extending support structure (not illustrated) that extends from the rear side of lower cabinet body portion 106 configured to mechanically support a cabinet top light 128 and one or more additional game displays 130 and 134. Further, the upper cabinet portion support structure may conceal power and communication lines between (1) the control systems and components located within the lower cabinet body portion 106 and (2) the displays mounted on the upper cabinet body portion 126 support structure.

In some implementations, the cabinet top light 128 can be mounted at a topmost end of the support structure of the upper cabinet portion 106, the cabinet top light 128 may be provided. The cabinet top light 128 may be capable of illumination in a variety of colors and is utilized to indicate and communicate conditions of the gaming system 100 to gaming players and service personnel.

In some implementations, the additional display devices 130 and 134 can be disposed generally in a vertical relationship and generally in alignment with the display device 120. The display devices 130 and 134 can be the same or similar to the display device 120 described above. Further, like the display device 120, the second display devices 130 and 134 can be mounted within and framed by second display frame 132 and third display frame 136, respectively. The second display frame 132 and the third display frame 136 can be attached to the upper cabinet support structure and can protect the second display device 130 and the third display device 134.

In some implementations, the display device 120, 130, and 134 can be disposed at an angle from each other to form a player-facing concave arc. However, in some implementations, the angles between the displays 120, 130, and 134 may be adjustable and may be smaller or greater than the angles illustrated in FIG. 1. Further, it is understood that in some implementations the displays may be disposed in a common plane relative to each other. In some implementations, the curved displays may be used for any or all of the display devices 120, 130, and 134. Similarly, any of the displays used for gaming system 100 can be based on flexible display technologies. For example, it is possible to utilize flexible display technologies to create uniquely shaped curving, wavy, or tubular display structures to provide one or more of the display devices 120, 130, and 134. Additionally, in some implementations flexible display technologies can be used in combination with fixed flat screen technologies.

While the display devices 120, 130, and 134 have been described as implemented with video technologies, in some implementations, mechanical display devices (e.g., reels or wheels) with segments containing game indicia and step motor controllers may be employed to provide game information to a player. In some implementations, the segments may include printed symbols. In another implementation, the mechanical display devices may include flexible video display technology as the reel strips on mechanical reels. Thus, games implemented in video form can readily be implemented with mechanical display devices utilizing such display technology. Alternatively, in other implementations mechanical display devices with segments having fixed symbols could be used to implement the game.

The gaming system 100 may also include cabinet lighting design functions to attract players. In the example gaming system 100 illustrated in FIG. 1, attractive cabinet lighting is provided by frame accent lighting 138. It is noted that frame accent lighting 138 is a common structure found on the first display frame 122, the second display frame 132, and the third display frame 136 and player interaction area 112. Example areas where frame accent lighting is applied to the gaming system 100 are commonly designated as frame accent lighting 138.

Frame accent lighting 138 may have multiple components. The side edge pieces of first display frame 122, second display frame 132, third display frame 136, and the edge structure of player interaction area 112 can be made of a translucent or transparent plastic or other suitable materials. Linear arrays, or strips, of light emitting diodes (LEDs) (not shown) on circuit boards may be mounted below the translucent or transparent plastic side edge pieces 138. In some implementations, the circuit boards are flexible circuit boards. These LED strips and transparent or translucent coverings may surround one or more gaming system displays frames, as well as the player interaction area, to highlight these areas.

In some implementations, the individual LEDs mounted on the LED strips are of a type that can emit red, green, and blue light. In an alternative implementation, separate LEDs are used for the light colors. All LED strips can be electrically connected and can be controlled by a cabinet lighting controller (e.g., cabinet lighting controller 218 in FIG. 2) in conjunction with a processor of the gaming system 100 to selectively mix the emitted light colors in a manner to create any color. The cabinet lighting controller can flash and vary lighting as desired. For example, cabinet edge lighting can change and flash in combination with music rhythms or in combination with game events. Other variations are possible.

In some implementations, cabinet 104 may include LED strip lighting or LED rope lighting to accentuate the cabinet and enhance the attractiveness of the gaming system 100 to players. LED rope lighting is a number of small light-emitting diode bulbs linked together and encased in a plastic, polyvinylchloride, or other suitable material to create a string of lights. For example, in one implementation illustrated in FIG. 1, cabinet 104 includes cabinet accent lighting 140. In some implementations, cabinet accent lighting 140 is LED rope lighting mounted flush with the front side edge of the cabinet side panels 108. The LED rope lighting can generate any suitable colors, and are controlled by cabinet lighting controller and a processor of gaming system 100 to selectively mix the emitted light colors in a manner to create any color in the same manner as the frame edge lighting.

In some implementations, gaming system 100 includes one or more audio speakers 142 and appropriate driving electronics and sound cards so that game players may experience pleasing audio aspects of the gaming system 100. Audio is desirable to attract and maintain player interest in gaming system 100. The gaming system 100 may also emit attraction sounds during any idle period of gaming system 100. Game audio may add to the player's enjoyment of gaming system 100 by providing music and sound effects designed to enhance and compliment the gaming experience. In FIG. 1, the audio speakers 142 are shown mounted on the upper corners of second display frame 132. Any suitable number of additional speakers 142 may be provided on additional display frames or on the lower cabinet body portion 106 as desired.

The speakers 142 designed for emitting bass vibrations may be included in some implementations. Placement of the speakers 142 may be selected to enhance the sound emitting characteristics of the gaming system 100. For example, bass speakers or additional speakers 144 may be mounted inside lower cabinet body portion 106. Further, it is envisioned that in some implementations sound processing such as multi-channel processing and surround sound processing are included in gaming system 100. Audio jacks for attachment of player headphones may also be provided in some implementations of gaming system 100 for the player to further enhance the audio experience of the game and also to block out noise from other gaming systems.

In some implementations, the front panel 110 of lower cabinet body portion 106 includes a locked removable panel or locked door (not shown), which can be opened for access to internal control system and technology components that are housed within lower cabinet body portion 106 (discussed hereinbelow with respect to FIG. 2). The front panel 110 may be flanked on vertical sides by cabinet side panel extensions 146 which serve to define a space below player interaction area 112 for players to place their feet and legs while they are playing the gaming system 100 in a seated position. Foot rest 148, which may be cushioned, is provided below player interaction area 112 to enhance a player's ergonomic comfort while playing the gaming system 100. In some implementations, the edges of player interaction area 112 may be ergonomically cushioned as well.

While FIG. 1 illustrates an example of gaming system 100 having a particular form and layout, it is understood that the gaming system 100 may be embodied in alternative gaming system housing forms and layouts. For example, in some implementations the gaming system 100 may be disposed in a housing style referred to as a "slant top" gaming system that is designed to be operated with the player comfortably seated. In this arrangement, generally, the gaming display(s) and all player I/O controls are located on a low, wide, surface that extends forwardly from the player on a horizontal plane and then slopes upwardly and away from the player's seated location.

Additionally, in some implementations, housing styles of cabinet 104 of gaming system 100 may include bar top or table top housing arrangements. These housings are generally small enough to be placed on top of an existing bar or table while providing the requisite gaming system housing functions of protection of/access to gaming electronics, displays, and player I/O functions described above.

In some implementations, cabinet 104 may also be an embedded housing. Embedded housings are built into structures designed to otherwise function as bars or tables in a gaming environment. Displays may be integral with the bar top or table top surface or the entire unit may be contained below a transparent bar or table top surface while controls are disposed on the lower front or side of the bar or table.

Further, in implementations, the gaming system 100 may have fewer or greater numbers of display devices 120, 130, 134 that display the game and game-related information to the player. If multiple displays are used, the displays may be of similar size, shape, and orientation or the displays may be divergent from each other in one or more of their respective descriptive characteristics. The one or more displays can be supported by, mounted upon, or housed within a cabinet 104 which can comprise a variety of shapes, sizes, and forms. If a single display device 120 is used, such device may encompass the structure and function of the other display devices 130 and 134. For example, the display device 120 can be a single unit spanning the lower cabinet body portion 106 and the upper cabinet body portion 126 of the gaming system 100.

Figure 2:
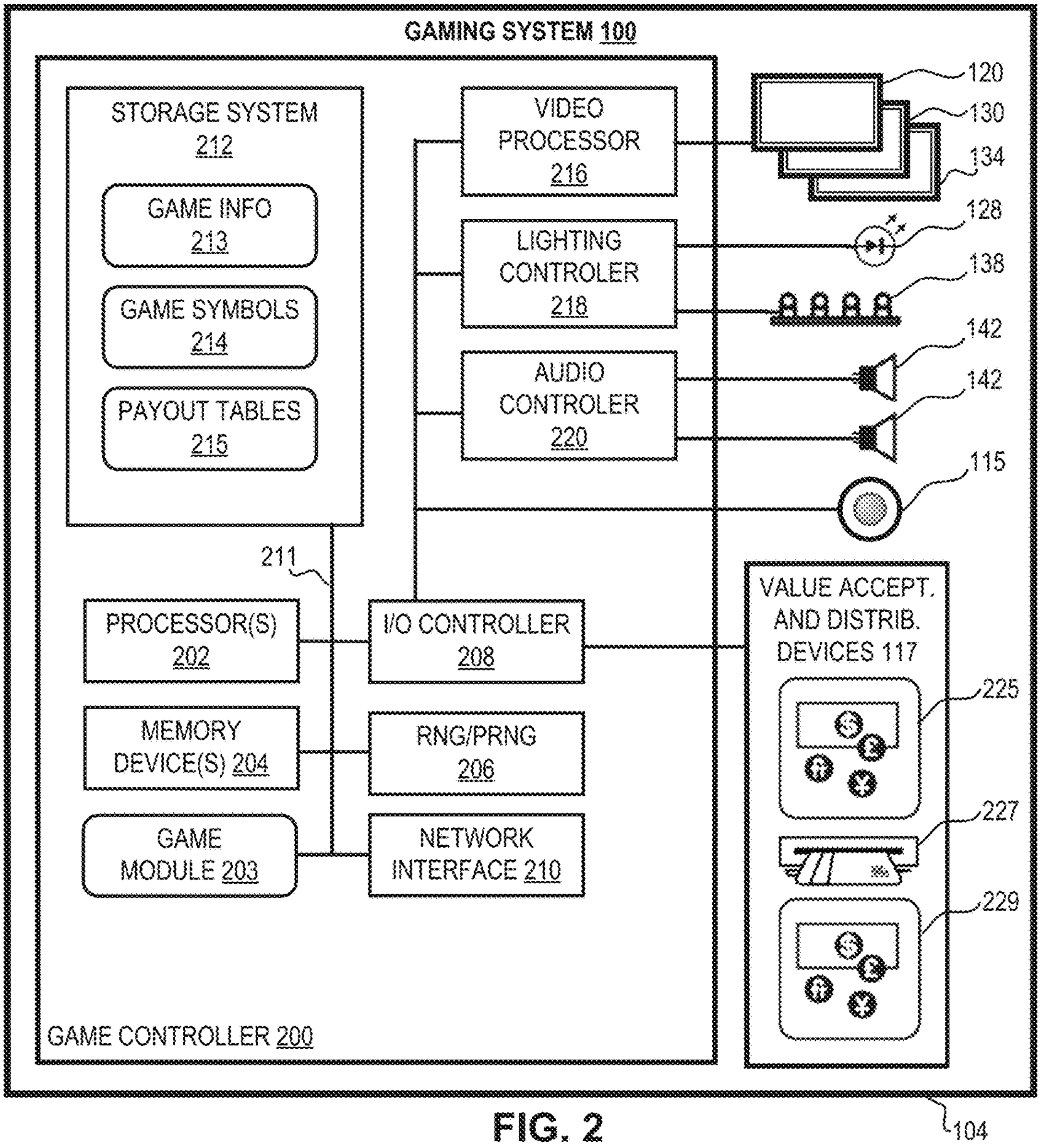
FIG. 2 shows a functional block diagram illustrating an example of game controller of a gaming system in accordance with aspects of the present disclosure.

FIG. 2 shows a functional block diagram illustrating an example of a game controller 200 that controls a gaming system 100 in accordance with aspects of the present disclosure. The gaming system 100 can include a cabinet 104, one or more player input devices 115, one or more value acceptance and distribution devices 117, one or more displays 120, 130, and 134, a cabinet top light 128, accent lighting 138, and one or more audio speakers 142, which can be the same or similar to that previously described herein.

In accordance with aspects of the present disclosure, the game controller 200 includes hardware and software configured perform specialized game processes and functions, as described herein. In some implementations, the game controller 200 is specially configured for the purpose of performing game processes and functions. The hardware and software elements shown in FIG. 2 cooperate, on a broad and general level, to function as specialized gaming system. Implementations of the game controller 200 includes one or more processors 202, a memory device 204 (e.g., random access memory and read only memory), a random number generator 206, an I/O controller 208, a network interface 210, and a storage system 212. Additionally, the game controller 200 includes at least one communication channel 211 (e.g., a data bus) by which the processor 202 is operatively and communicatively coupled to the memory device 204, the random number generator 206, the I/O controller 208, the network interface 210, and the storage system 212.

The memory device 204 can include a local memory (e.g., a random-access memory and a cache memory) employed during execution of program instructions. In some implementations, the memory device 204 includes one or more memory structures for storing instructions and various types of game data. The memory structures include one or more random access memory units (RAMs) units, one or more read only memory units (ROMs), one or more flash memory units including solid state drives (SSDs), one or more electrically erasable/programmable read only memory units (EEPROMs). In some implementations, communication with the memory device 204 by the processor 202 or a controller, encompasses the processor or controller accessing the memory device 204, exchanging data with the memory device 204, or storing data to the memory device 204.

The storage system 212 can comprise a computer-readable hardware storage device that stores information and program instructions. For example, the storage system 212 can be one or more flash drives and/or hard disk drives. In accordance with aspects of the present disclosure, the storage system 212 can include, for example, game information 213, game symbols 214, and payout tables 215. The game information 213 can be information that is obtained and updated during the play of a game. For example, the game information may include a player identification, player demographic information, player account information, player tracking information, and game credit information. The game symbols 214 can be one or more sets of symbols that may be selected and displayed in game display during play of a game. The individual sets of symbols in the game symbols 214 may include a number of symbols. The sets of symbols can be associated with the same or different symbols. In implementations, the sets of symbols may include numbers, letters, geometric figures, symbols, images, character, blank symbols (e.g., the absence of symbols), animations, transparent symbols (e.g., symbols that permits underlying symbols to be visible), or any other suitable graphical depiction. The symbols in the set of symbols may include pay symbols and special or designated symbols (e.g., trigger symbols and bonus symbols). The pay tables 215 may be one or more tables that map predefined winning symbols (e.g., "Instant Win") or winning combinations of symbols (e.g., 7-7-7) in the game symbols 214 with predetermined monetary awards or other awards.

The network interface 210 can be configured to communicate with external devices through a communication network (e.g., a peer-to-peer network, a local area network, a wide area network, or the Internet). The network interface 210 can be a digital circuit board or card installed in game controller 200 to provide network communications with the external devices. For example, the game controller 200 may use the network interface 210 communicate with one or more central servers, controllers, or remote devices to execute games, establish credit balances, participate in jackpots, etc.

The processor 202 can be a microprocessor, microchip, or application-specific integrated circuit. In some implementations, the processor 202 is specially configured with arithmetic logic units and math co-processors (e.g., floating point units) for executing the game consistent with the various implementations disclosed herein. In some implementations, the processor 202 includes registers for holding instructions or other data, and cache memory for storing data for faster operation thereupon. In some implementations, the processor 202 may be a multi-core processor that includes two or more processors for enhanced performance, more efficient parallel processing, or other advantageous computing functions.

The processor 202 executes computer program instructions (e.g., an operating system and/or gaming applications), which can be stored in the memory device 204 and/or storage system 212. For example, the processor 202 can execute a game module 203. The gaming module 203 may include program instructions and operation data that configure and control the game controller 200 to provide gaming features described hereinbelow. For example, the program instructions can include gaming system initialization software, system basic input and output software, operating system software, value acceptor software, value dispenser software, display image generation software, game symbol set image generation software, game rule execution software, game data set(s), random number generation software, system driver software, system data bus management software, audio generation and speaker driver software, and video generation and display driver software, and other software routines for operation of the game controller 200. Additionally, the operation data can include, for example, game image data, game rule data, pay table data, game mode and timing data, gaming value and wager parameter data, and random or pseudo-random number generation data.

While the game module 203 is described as a single unit, it is understood that the functionality of the gaming module can be divided among a number of different units. Additionally, while the game module 203 is shown in FIG. 2 as residing in the game controller 200, it is understood that the game module 203 may be stored in the storage system 212. In addition, in some implementations, the gaming module 203 can be stored in a distributed manner such that some code is stored in memory device 204 and other code is stored remotely from the game controller 200. For example, part or all of the code and operational data for operation of the gaming system or for execution of the game features may be stored in a remote memory structure and be downloaded to the memory device 204 via a network connection.

In accordance with aspects of the present disclosure, the I/O controller 208 comprises hardware, software, or a combination of hardware and software that receives and processes player inputs from various input devices (e.g., input device 115), and that communicates outputs of the game control to the player via output devices display devices (e.g., display devices 120, 130, and 134), lighting devices (e.g., top light 128 and accent lights 138) and audio devices (e.g., audio speakers 142). The I/O controller 208 may also function as the intermediary between the processor 202 and one or more output devices to control information and data flow therebetween. The I/O controller 208 is configured to understand the communication and operational details (e.g., hardware addresses) for the attached player input device 115, the value acceptance and distribution devices 117, video processor 216, lighting controller 218, and audio controller 220. In this manner, processor 202 may be freed from the operational details of the peripheral I/O devices. For example, in some implementations where an input or output device is changed or upgraded, the I/O controller 208 can be changed without changing other gaming system components.

In accordance with aspects of the present disclosure, the random number generator (RNG) 206 comprises hardware, software, or a combination of hardware and software that generates random numbers or pseudo-random numbers. The RNG 206 generates random numbers for use by the gaming software during game execution. In some implementations, random numbers are utilized by game software for the random selection of one or more game symbols from a set of game symbols during a game. In some implementations, the RNG 206 is a software module configured to be executed by the processor 202 for the generation of a true random or pseudo-random number. The code for RNG 206 may be stored in the memory device 204. In some implementations, the RNG 206 is a hardware based random number generator. As noted above, the gaming system may rely on random generation performed by a pseudo RNG, a true RNG, or hardware RNG specifically designed for gaming systems that are in communication with processor 202. The hardware based random number generator may be incorporated into the processor 202 or can be separate from the processor 202.

The value acceptance and distribution devices 117 can include a value acceptor 225, a card reader/writer 227, and a value dispenser 229.

The value acceptor 225 is a device that reads, validates, and communicate the amount of the inserted value to the processor 202. In some implementations, the value acceptor 225 could include magnetic strip or chip card readers to accept and transfer value. The value acceptor 225 may also be configured to accept and transfer non-traditional currencies such as digital currencies. In implementations, I/O controller 206, the processor 202, or both contain appropriate control instructions to communicate and extract value from the inserted item containing value. In some implementations, use of a magnetic strip or embedded chip card, for example a bank card, for value insertion requires the processor 202 to communicate, via network interface controller 224 (described below), with devices external to a gaming system.

The card reader/writer 227 is a device that reads and writes information to and from data cards, such as player loyalty cards. For example, card reader/writer 227 can extract account identifying information from the card and utilizes this information to access the associated account information stored remotely via network interface controller 224. In implementations where player loyalty/player tracking systems are employed, a player's loyalty account and record of gaming activity can be stored in a networked storage location or database. The processor 202 is configured to record the player's gaming activity in memory device 204 during the duration of loyalty card insertion. When the loyalty card is removed from card reader/writer 227, recorded gaming activity is uploaded, via network interface controller 224, to the remote storage location associated with the player's account. In this manner, the player's gaming activity can be further processed and analyzed, and the player can be awarded loyalty rewards based upon his activity data.

The value dispenser 229 is a device that provides monetary funds to players in one or more forms. In some implementations, the player's credit value may be issued to the player via a printed and dispensed encoded paper ticket or token which the player can then exchange at a special purpose kiosk or cashier location for the monetary value encoded into the ticket or token. In some implementations, the processor 202 can direct the value dispenser 229 to issue to the player an appropriate amount of coin or bills directly to the player. Additionally, or alternatively, in some implementations, the player may have the option to electronically direct the credit value to an account associated with the player.

Still referring to FIG. 2, the game controller 200 also controls the function of input and output devices utilized by a gaming system 100. In various implementations, I/O controller 206 serves as an interface unit between processor 202 and some of the output devices, such as a video processor 216, a cabinet lighting controller 218, and an audio controller 220.

The video processor 216 can be hardware, software, a combination of hardware and software that communicates with processor 202 to render all game graphics, video displays, and information on one or more video display units (e.g., displays 120, 130, and 134). In some implementations, the video processor 216 includes one or more processors, controllers, and/or graphics cards for processing the game images, outcomes, and animated displays and coordinating the processed data to be display between, among, or across any or all display devices. In various implementations, this may include being configured to simulate objects and the movement of objects which represent video reels containing sets of gaming symbols. It should be appreciated that in certain other implementations where physical mechanical reels are utilized by the gaming system 100 as a game displays, reel controllers and stepper motors would be provided in lieu of or in addition to video processor 216.

The lighting controller 218 can be hardware, software, a combination of hardware and software that controls lighting devices of gaming system 100. In implementations which utilize cabinet lighting as described with respect to FIG. 1, a cabinet lighting controller 218 may be utilized to coordinate and control the color and timing of cabinet lighting displays with processor 202.

The audio controller 218 can be hardware, software, a combination of hardware and software that controls audio devices of gaming system 100. In certain implementations which utilize sound design, processor 202 may utilize audio controller 220 to coordinate and control the sound emissions. In some implementations, audio controller 220 may include one or more audio processing cards for generating sound and for driving the one, two or more audio speakers that may be included with a gaming system.

In some implementations, various additional features and functions are performed by the game controller 200. For example, the game controller 200 may be configured to track game play events that occur on a gaming system. In some implementations, the game controller 200 may audit all recorded monetary transactions, including all wager amounts, game outcomes, game winnings, and game payouts that occur through the value dispenser 229. Further, some implementations may include security software to assist in protecting the gaming system 100 from tamper or alteration attempts.

In some implementations, memory devices, such as memory device 204, with the software components and other data may be secured and authenticated by authentication software stored in an unalterable memory device within the housing of the game controller 200. The game controller 200 may also include application specific integrated circuits (ASICs) to perform the security and authentication functions. At any appropriate time, such as before each play of a game, at a predetermined interval, upon transfer of any game data or any software components from a mass storage to the memory device 204, or upon demand, the game controller 200 (using a processor such as processor 202 or a separate ASIC) may execute an authentication routine and perform an authentication of any software component or other data of the game controller 200. In some implementations, the gaming system software components may be prepared for authentication via creation and storage of an encrypted signature unique to one or more of the software components.

In some implementations, an encrypted signature may be created by utilizing a hash function on a software component or code to form a message digest (i.e., a hash of the software component) followed by a key encryption of the message digest to form an encrypted signature unique to the software component. In some implementations, the key encryption may be public key encryption, private key encryption, or any suitable key encryption schema. The encrypted signature may be stored with the gaming system software component, for example, in a mass storage device or an unalterable memory. During a software component authentication, the gaming system 100 executes one or more authentication routines utilizing the same hash function to operate on the software component to compute, or re-create, a new message digest for the software component. The new or re-created message digest may then be compared with a previously created message digest obtained by decrypting the stored encrypted signature. Matching message digests between the new and previously created message digests indicate that the software component is authentic and the game controller 200 may allow game play to proceed. However, when the message digests do not match, the game controller 200 may determine that the software component under authentication may be corrupted or fraudulent and game play may be halted. It should be appreciated that the game controller 200 may perform other suitable security and authentication checks on the game data or software components. Such authentication and security devices and functions are unique to gaming and casino industry to minimize or prevent fraud in gaming systems and gaming systems.

The gaming system 100 and game controller 200 shown in FIG. 2 provide non-limiting examples consistent with implementations of the present disclosure. It is understood that the functional elements and operations described in relation to FIG. 2 can be embodied in hardware, software, or a combination thereof. Described hardware includes the structures described and their functional or operational equivalents. Described functions may be performed by hardware, digital circuitry, computer software, computer firmware, or functionally equivalent combinations thereof.

Gaming System Operation

The flowcharts in FIGS. 3A-3D illustrate functionality and operation of possible implementations of systems, devices, methods, and computer program products according to various implementations of the present disclosure. Each block in the flow diagrams of FIGS. 3A-3D can represent a module, segment, or portion of program instructions, which includes one or more computer executable instructions for implementing the illustrated functions and operations. In some implementations, the functions and/or operations illustrated in a particular block of the flow diagrams can occur out of the order shown in FIGS. 3A-3D. For example, two blocks shown in succession can be executed substantially concurrently, or the blocks can sometimes be executed in the reverse order, depending upon the functionality involved. Additionally, in some implementations, the blocks of the flow diagrams can be rearranged. Further, in some implementations, the flow diagram can include fewer blocks or additional blocks. It will also be noted that each block of the flow diagram and combinations of blocks in the block diagram can be implemented by special purpose hardware-based systems that perform the specified functions or acts, or combinations of special purpose hardware and computer instructions.

FIGS. 3A-3D show a process flow diagram illustrating an example method 300 of operating the gaming system (e.g., gaming system 100) in accordance with aspects of the present disclosure. As described previously herein, a processor (e.g., processor 202) of a game controller (e.g., game controller 200) executes program instructions (e.g. game module 203) that control the gaming system to provide a first feature of the game and at least one second feature of the game. In the first feature of the game (e.g., a slot machine-type game), the gaming system evaluates a first feature outcome to determine whether it includes at least one initiator symbol and at least one activator symbol. When the gaming system determines that the first feature outcome includes an initiator symbol and an activator symbol, the gaming system randomly generates and displays at least one second feature of the game, which includes a quantity of second feature displays corresponding to the quantity of activator symbols displayed in the first feature outcome. The gaming system evaluates the displayed symbols of the second feature of the game and determines a second feature outcome, which the gaming system converts into one or more awards for the player.

In accordance with aspects of the present disclosure, the second feature displays are award wheels including a number segments (e.g., roulette-type wheels) comprising symbol display areas. In some implementations, the award wheels are a set of layered concentric award wheels having progressively smaller diameters and are configured to independently spin around a common axis such that at least annular portions of the individual wheels are visible to the player. When stopped, the award wheels may be configured to index one of the segments with an outcome selector, such as a radial pay line. During play of the second feature of the game, the gaming system displays or controls the award wheels to spin for a time before coming to a stop with a respective one of the second feature displays indexed with the outcome selector. In some implementations, all the award wheels spin, in other implementations, only award wheels activated by the activator symbols of the first feature spin. When the wheels stops spinning, the gaming system evaluates the symbols displayed in the segments indexed with the outcome selector and determines an award only based on the award wheels activated by the activator symbols. In some implementations, the gaming system repeats the second feature of the game until the one of the second feature outcomes includes a game termination symbol (e.g., "Game Over").

In some implementations, a game encompasses blocks 301-block 379. A play of a game begins with a wager and activation of a game and the play of the game ends when the features of the first feature (e.g., a base feature of the game) and a second feature (e.g., a bonus feature of the game), or both have completed, depending on whether the second feature of game is played. In another implementation, one play of a game comprises blocks 311-335, and terminating at either block 331 or block 335 depending on whether the gaming system activates the second feature of the game. In some implementations, blocks 381 and 383 are not part of a play of a game. In alternative implementations, blocks 381 and 383 is part of a play of a game.

More specifically, at block 301, the gaming system receives monetary value from a player via a value acceptor device (e.g., value acceptor 225). For example, the player can deposit currency into the value acceptor of the gaming system for game play. Alternatively, the player can deposit value by inserting an encoded paper ticket into the value acceptor for game play. At block 303, the gaming system determines a credit balance based on the monetary value received from the player at block 301. For example, the gaming system can establish a gaming credit balance for the player based on the communication from the value acceptor. The credits enable the player to initiate a play of a game and to also place wagers on the play of the game. The gaming system may provide a visual indication of the player's credit balance by controlling a display device to display the current balance (e.g., using one of displays devices 120, 130, and 134, the value acceptor 225, or the credit meter 405B of FIG. 4).

At 305, the gaming system receives a wager input for a play of a first feature of the game from the player. The wager input may include amount of a wager (e.g., an amount of currency or credits). For example, the player may communicate the amount of the wager input using a player input device (e.g., player input device 115 in player control area 114, or "Bet" button 405E in game display 400). The amount of the wager may be a minimum wager, a maximum wager, or any other wager amount therebetween. In some implementations, the player's wager amount may determine the value of some of the available awards. In some implementations, the gaming system may determine whether the player provided enough credits to enable the player's selected wager. The gaming system may also prevent the player from placing the wager and starting a play of a game if the player's credit balance is not large enough to support the player's selected wager. In such case, the gaming system may enable the player to insert additional value to obtain the minimum credit level or to cash out of the gaming system.

In some implementations, receiving a wager input at block 305 includes, at block 307, determining a number of active pay lines based on the amount of the wager. A pay line (e.g., pay lines 403 in FIG. 4) indicates combinations of symbols displayed in a displayed game outcome that may pay an award (e.g., three aces along active pay line 403A in FIG. 4). If a pay line is not active (e.g., pay line 403C in FIG. 4), the gaming system does not pay an award for winning symbols or combinations of symbols along that pay line. In some implementations, depending on the wager amount, the gaming system may enable the player to manually activate pay lines (e.g., using pay line selector button 405G in FIG. 4). In some implementations, the gaming system automatically activates pay lines based on an amount of the player's wager. In some implementations, the gaming system may control one or more display devices (e.g., display device 120) to indicate the active pay lines (e.g., using pay line indicators 437 in FIG. 4 or by shading the display of symbology of the inactive pay line 403C).

At block 309, the gaming system updates the gaming credit balance determined at block 303 based on the wager input at block 305. For example, the gaming system deducts the amount of the wager from the gaming credit balance. At block 311, the gaming system initiates play of a first feature of the game. In some implementations, initiating play of the game may include the gaming system securely accessing game data from a memory device and executing an authentication routine on the game data to start a play of a game. Additionally, in some implementations, initiating the play of the first feature of the game includes, at block 313, receiving a request to initiate the play of the game via a player input device (e.g., one of player inputs 115 of the player control area 114). For example, the player may actuate a game start button, a spin button, or a lever on the gaming system to start spinning slot machine reels of the gaming system (or randomly generating symbols using other methods discussed above for virtual reels) for the play of the game. In some implementations, the first feature of the game is slot machine game. It is understood that some implementations can use other types of games as the first feature of the game, including games without slot machine reels.

At block 315, the gaming system uses a random number generator (e.g., RNG 206) to randomly generate symbols for the game from sets of symbols. For example, the gaming system may generate a first feature outcome by randomly selecting the symbols from one or more sets of game symbols (e.g. game symbols 214). As a non-limiting example, the sets of game symbols can include numbers, letters, geometric figures, symbols, images, character, animations, blank symbols (e.g., the absence of symbols), or any other suitable graphical depiction. In some implementations, the random generation of symbols may be performed with electro-mechanical components. For example, the gaming system may incorporate mechanical reels.

Figure 4:
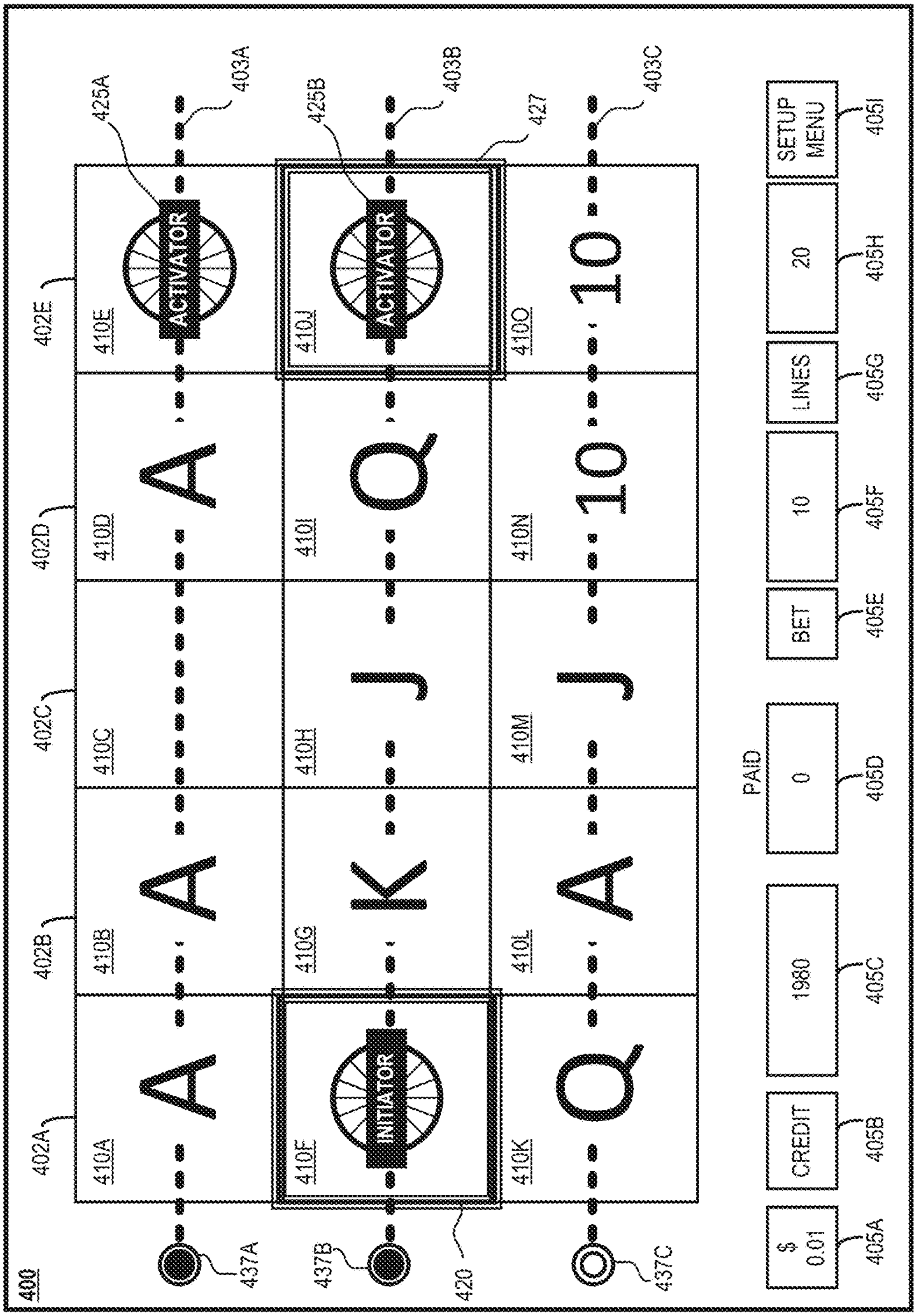
FIG. 4 shows a picture of a gaming system display illustrating an example of slot machine reels including initiator symbols and activator symbols in accordance with aspects of the present disclosure.

At block 317, the gaming system displays (e.g., using display device 120) the symbols generated at block 315 to the player as a first feature outcome. For example, when the first feature is a slot machine-type game (such as illustrated in FIG. 4), the gaming system may display the generated symbols in visible symbol display areas of the individual reels (e.g., symbol display areas 410 in FIG. 4). Upon initiation of the game at block 313, the gaming system may show a display of spinning reels for each of the reels (e.g., reels 402A-402E in FIG. 4). The spinning may appear to occur in a vertical top to bottom direction or in a vertical bottom to top direction (not shown), or in a combination of vertical directions (not shown). In a non-limiting example of a mechanical slot machine implementation of the first feature of the game, the gaming system can stop reels of the slot machine by actuating, on a random timing basis, a suitable mechanical or electro-mechanical reel brake. When the reels stop rotating, one or more displayed stop positions of the reels are detected. Since the stop positions are associated with respective indicia or symbols, the gaming system can determine whether the combination of stop positions (i.e., translating to a combination of displayed symbols) results in a winning symbol combination.

Figure 3A:
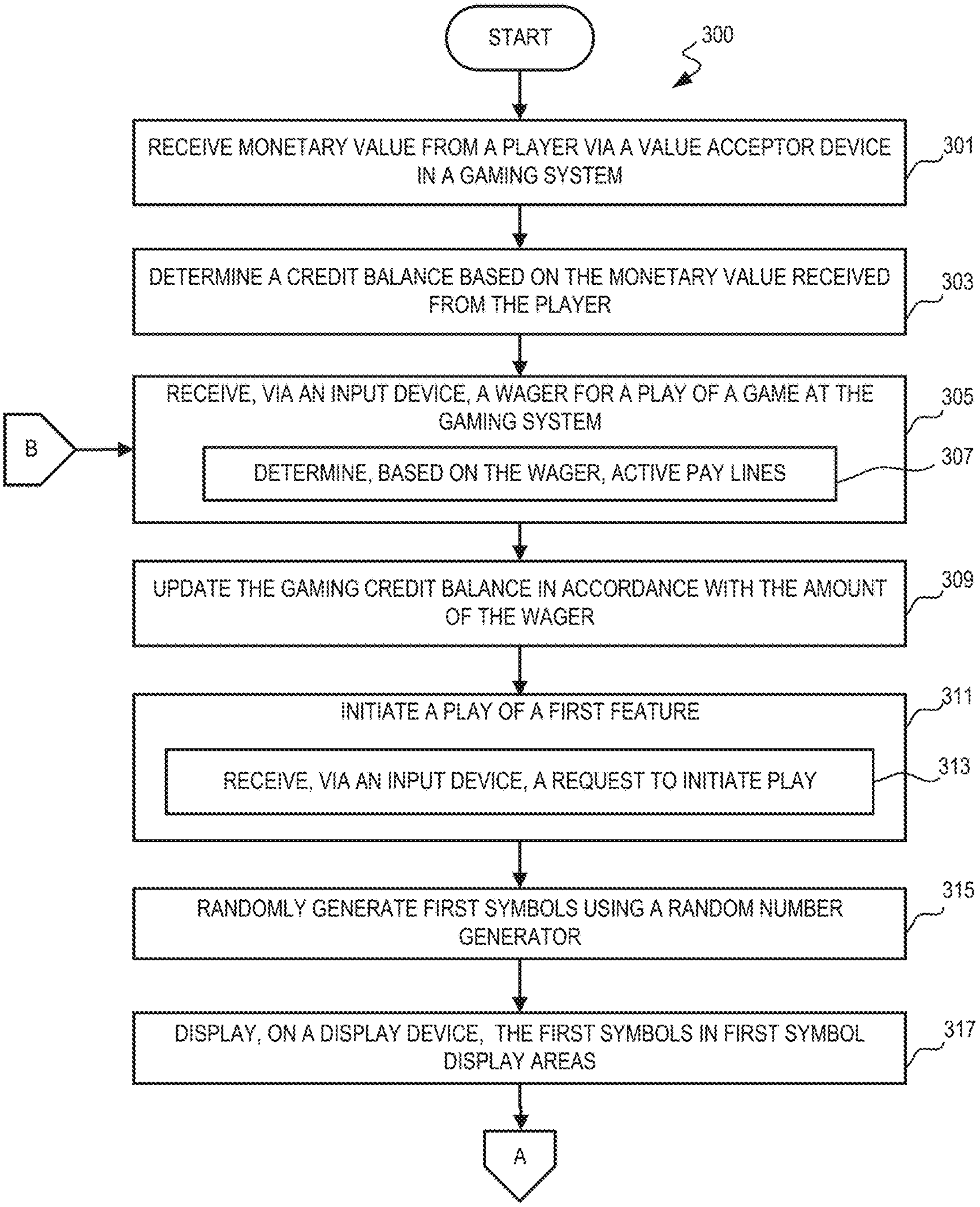
FIG. 3A shows a process flow diagram illustrating an example method of operating the gaming system in accordance with aspects of the present disclosure.
Figure 3B:
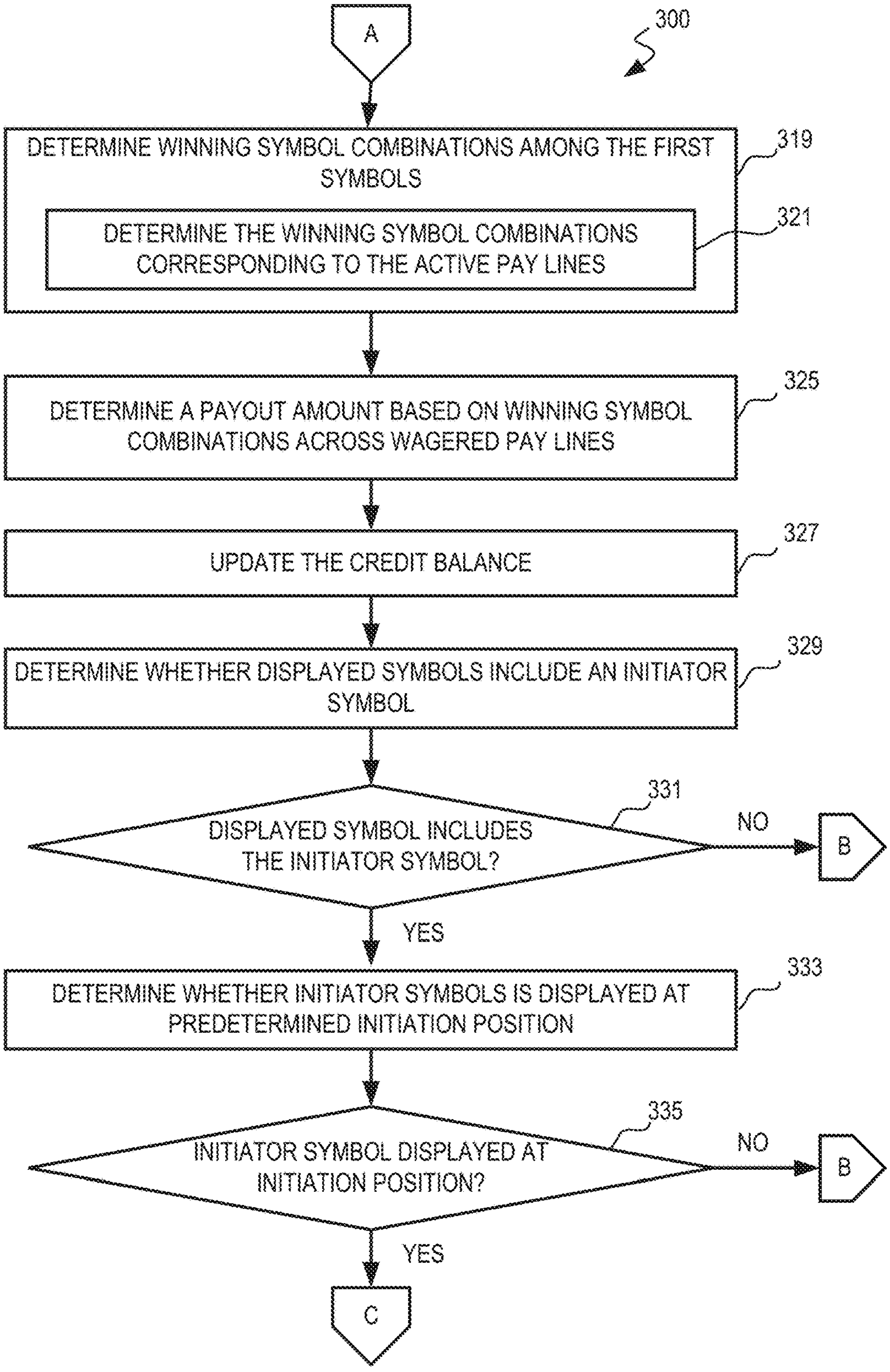
FIG. 3B shows a process flow diagram illustrating an example method of operating the gaming system in accordance with aspects of the present disclosure.
Figure 3C:
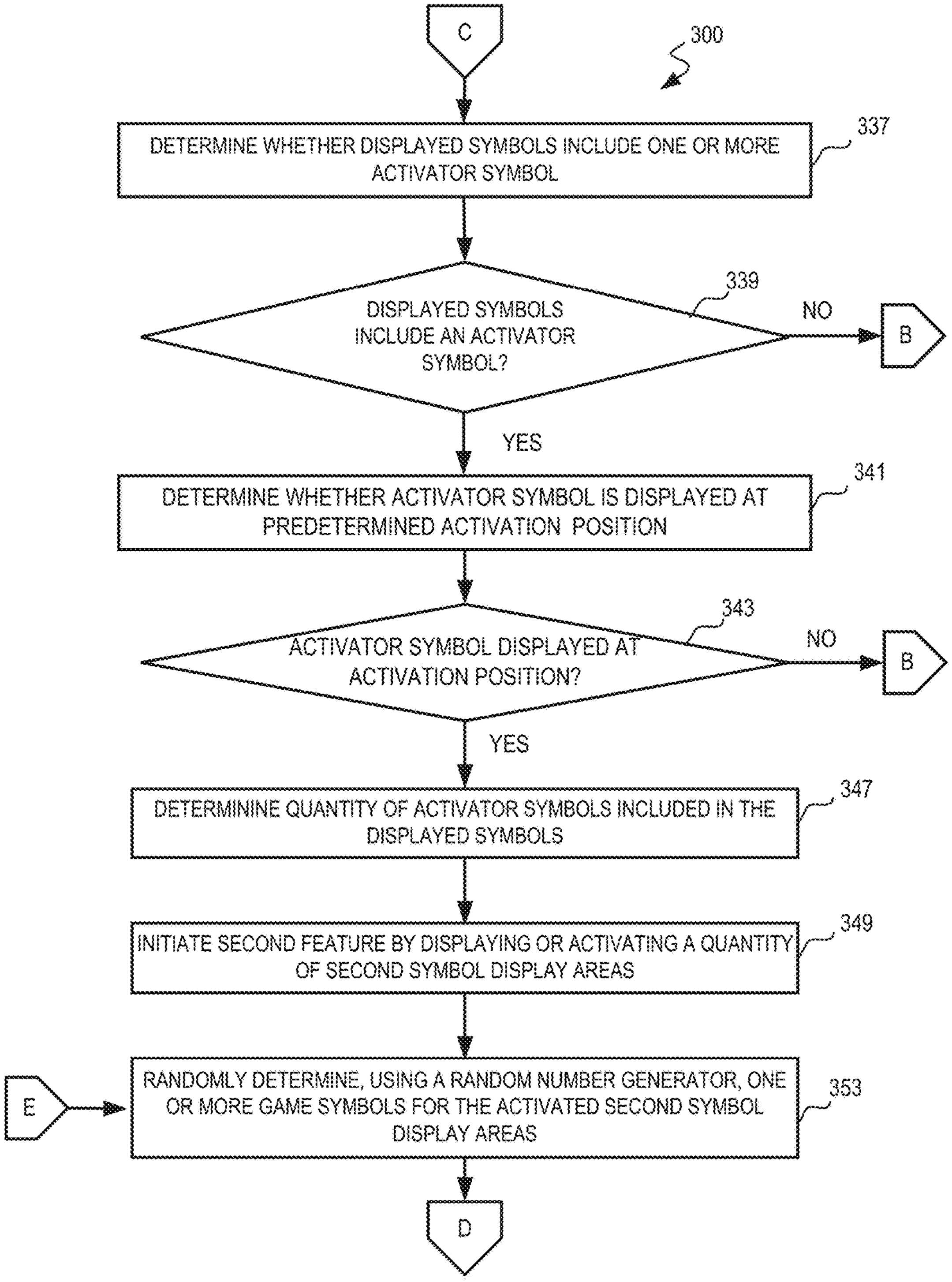
FIG. 3C shows a process flow diagram illustrating an example method of operating the gaming system in accordance with aspects of the present disclosure.

Continuing the method 300 in FIG. 3B, as indicted by off-page connector "A," at block 319 the gaming system determines winning symbol combinations among the symbols displayed in the first feature outcome at block 317. In various implementations, the gaming system determines winning symbol combinations by comparing the symbols displayed at 317 to predetermined wagering outcomes (e.g., payout tables 215). In some implementations, at block 321, the gaming system evaluates the winning symbol combinations corresponding to the active pay lines determined at block 307. For example, if a pay table associated with the gaming system indicated that at least three of the same bar symbols is a winning symbol combination and awards a predetermined payout, the gaming system would evaluate the generated symbols for bar symbols. If the gaming system generated at least three bar symbols on adjacent reels and along an active pay line, the gaming system may determine that the three bar symbols is a winning symbol combination based on the predetermined pay table. It should be appreciated that a pay table may include any suitable number of winning symbol combinations and payouts. In some implementations, a pay table may indicate that as few as one symbol may be associated with a payout. Alternatively, two or more symbols may be used to form winning symbol combinations that result in a payout.

At block 325, the gaming system determines a payout amount based on the winning symbol combinations determined at block 319. In some implementations, the gaming system only determines an award amount based on winning symbol combinations formed across the reels along the active pay lines determined at block 307. At block 327, the gaming system updates the gaming credit balance updated at 309 with the payout amount determined at 325, if any. In some implementations, the gaming system also updates the displayed credit balance to correspond to credit balance updated at block 327. In some implementations, the credit balance is not updated until a later time (e.g., after completion of a second feature of the game).

At block 329, the gaming system determines whether the symbols displayed in the first feature outcome at block 317 include an initiator symbol (e.g., initiator symbol 425 in FIG. 4). At block 331, if the gaming system determines that the symbols displayed at block 317 do not include an initiator symbol (e.g., block 329 is "No"), the method 300 iteratively returns to block 308 via off-page connector "B". If the gaming system determines that the symbols displayed at block 317 include an initiator symbol (e.g., block 329 is "Yes"), then at block 333, the gaming system determines whether the initiator symbol identified at block 329 is at an initiation position (e.g., initiation position 420 in FIG. 4). In some implementations, the initiation position is a predetermined one or more of the first symbol display areas. For example, in some implementations, the first symbol display areas may be a particular reel of a slot machine (e.g., reel 402A in FIG. 4). In another implementation, the initiation position can be a single, predetermined symbol location of one for the reels (e.g., symbol display area 410F in FIG. 4). Also, in some implementations, the initiation position can be multiple predetermined symbol locations on the reels of the slot machine. In various implementations, only initiation positions located along the active pay lines determined at block 307 are eligible initiation positions. Put another way, symbol locations along non-active pay lines may be excluded from being initiation positions. In some implementations, the gaming system does not require a particular initiation position. For example, the initiator symbol serves its initiation function anywhere the initiator symbol is generated in the first symbol display areas. At block 335, if the gaming system determines that the symbols displayed at block 317 do not include an initiator symbol (e.g., block 370 is "No") at an initiation position, the method 300 iteratively returns to block 305 via off-page connector "B." If at block 335 the gaming system determines that the symbols displayed at block 317 include an initiator symbol (e.g., block 370 is "Yes"), then method 300 continues to block 337 in FIG. 3C via linking reference "C."

At block 337, the gaming system determines whether the symbols displayed in the first feature outcome at 317 include one or more activator symbols (e.g., activator symbol 420 in FIG. 4). The activator symbol can be a same or different type of symbol than the initiator symbol. For example, in some implementations, the initiator symbol and the activator symbol can both be wheel symbols. (See, e.g., in FIG. 4.) At block 339, if the gaming system determines that the symbols displayed in the first feature outcome at 317 do not include an activator symbol (e.g., block 339 is "No"), the method 300 iteratively returns to block 305 via off-page connector "B". If the gaming system determines at block 339 that the symbols displayed in the first feature outcome at 317 include at least one activator symbol (e.g., block 339 is "Yes"), then at block 341, the gaming system determines whether one or more of the activator symbols identified at 337 are at an activation position (e.g., activation position 427 in FIG. 4). Similar to that described previously with regard to the initiator symbol, in some implementations, the activation positions are a predetermined one or more of the first symbol display areas. In some implementations, the activation positions are multiple predetermined symbol locations on a particular reel of a slot machine (e.g., reel 402E in FIG. 4). In another implementation, the activation position can be a single, predetermined symbol location of one for the reels (e.g., symbol display area 410J in FIG. 4). And, in various implementations, only activation positions located along the active pay lines determined at block 307 are eligible activation positions. In some implementations, activation positions are anywhere the gaming system generates and displays the activator symbols (e.g., the activation positions are not predetermined). In some implementations the initiator symbols and activator symbols are different symbols. In alternative implementations, the initiator symbols and activator symbols can be the same predetermined symbol. For example, a first one of the predetermined symbols can be designated as the initiator symbol, and every additional one of the predetermined symbol displayed on the reels can be an activator symbol.

At block 343, if the gaming system determines that the symbols displayed in the first feature outcome at 317 do not include an activator symbol (e.g., block 343 is "No") at an activation position, the method 300 iteratively returns to block 305 via off-page connector "B". If, at block 343, the gaming system determines that the symbols displayed in the first feature outcome at 317 include an activator symbol at an activation position (e.g., block 343 is "Yes"), then method 300 continues to block 347, in which the gaming system determines a quantity of activator symbol included in the symbols displayed in the first feature outcome at block 317. In some implementations, only activator symbols in activation positions determined at 337 are counted in the quantity at 347. However, in some implementations, any displayed activator symbol in any symbol display area can be counted in the quantity at 347.

At block 349, the gaming system initiates a second feature of the game by displaying or activating a quantity of second feature displays corresponding the quantity of activator symbols determined at block 347. In some implementations, the quantity of second feature displays displayed or activated is equal to the quantity of activator symbols determined at block 347. For example, when the gaming system determines at block 347 that symbols displayed in the first feature outcome at block 317 include at least initiator symbol at block 329 and one activator symbol at block 337, the gaming system may initiate the second feature of the game by generating or activating one second symbol display (e.g., a single award wheel). And, when the gaming system determines at block 347 that symbols displayed in the first feature outcome at 317 include at least one initiator symbol at block 329 and three activator symbols at block 337, the gaming system may generate or activate three (3) second feature displays (e.g., a three award wheels).

At block 353, the gaming system uses a random number generator to randomly generate symbols from sets of symbols for the second feature displays displayed or activated at block 349. The second feature symbols can be generated in a same or similar manner to that previously described with regard to the first feature symbols in reference to block 315. In some implementations, the second display areas can be award wheels and the symbols can map to different sections of the award wheel (as shown, e.g., in FIG. 5). In some such implementations, the award wheels are associated with respective sets of symbols (e.g., in game symbols 214).

Figure 3D:
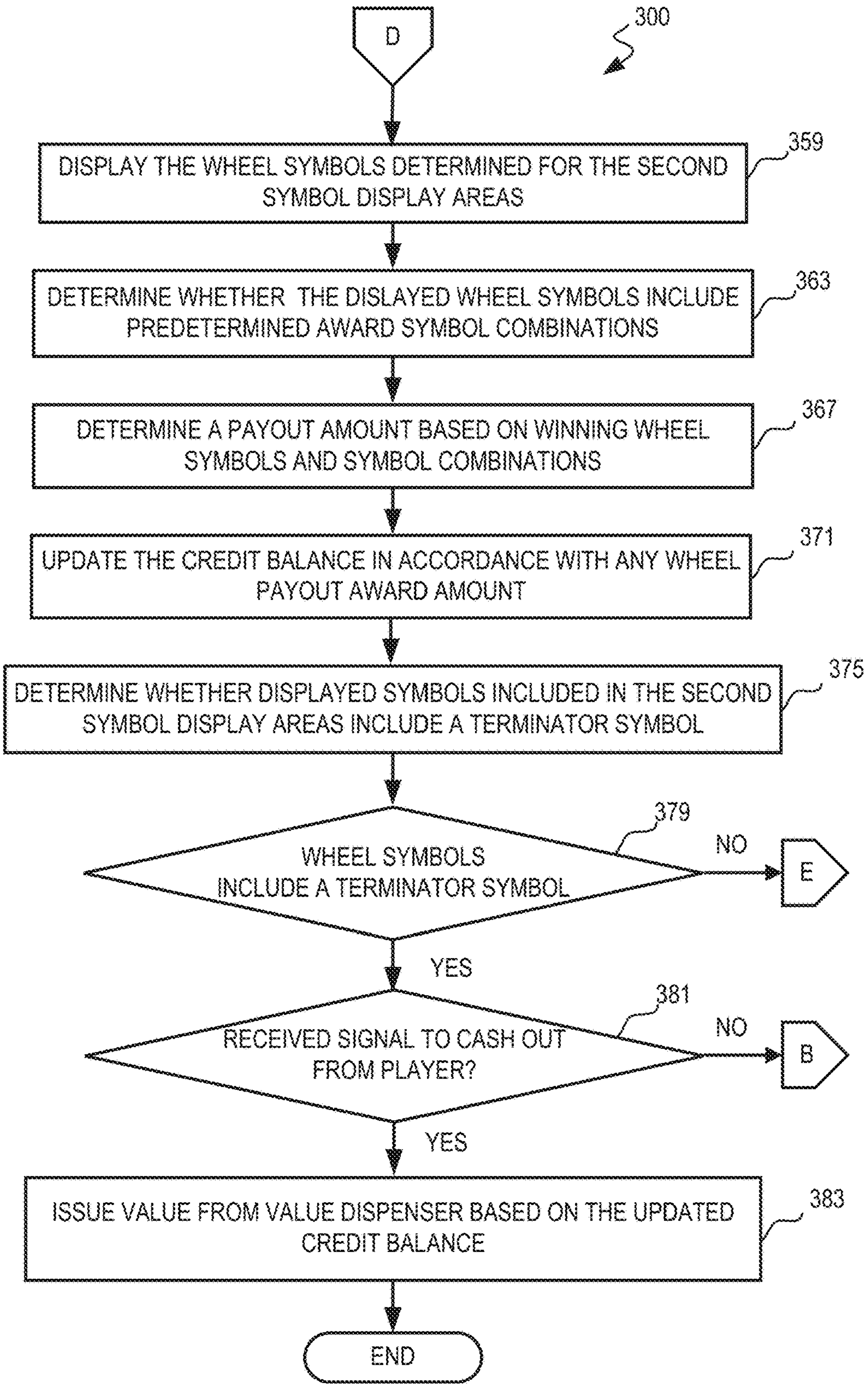
FIG. 3D shows a process flow diagram illustrating an example method of operating the gaming system in accordance with aspects of the present disclosure.

Continuing the process in FIG. 3D via linking off-page connector "D," at block 359, the gaming system displays (e.g., using one of display devices 120, 130, or 134) the symbols generated at block 353 as a second feature outcome. Where the displays of the second feature of the game are award wheels (as shown, e.g., in FIG. 4), the gaming system may display the generated symbols in visible symbol display areas of the award wheels. At block 363, the gaming system determines winning symbols or winning symbol combinations among the symbols displayed in the second feature outcome at 359. In some implementations, the determination of winning symbols or winning symbol combinations can be performed in a same or similar manner as previously described with regard to block 319. For example, the gaming system may identify winning symbols coinciding with a selector (e.g., index selector 525 in FIG. 5) or an active pay line (e.g., pay line 527 in FIG. 5). In some implementations, the gaming system only evaluates the winning symbol combinations based on a combination of symbols displayed on the second feature displays activated at block 349 based on the number of activator symbols determined at block 347

At block 367, the gaming system determines a payout amount based on the winning symbols and winning symbol combinations determined at block 363. For example, if the gaming system activated three second feature displays at block 349, then at block 367 the gaming system may combine the wining symbols displayed at block 359. Additionally, or alternatively, if a pay table associated with the gaming system indicated that a combination of at least three of the same jackpot symbols is a winning symbol combination and awards a predetermined payout, the gaming system would evaluate the generated symbols for jackpot symbols. If the gaming system generated at least three jackpot symbols, the gaming system may determine that the three jackpot symbols is a winning symbol combination based on the predetermined pay table. It should be appreciated that a pay table may include any suitable number of winning symbol combinations and payouts. In some implementations, a pay table may indicate that as few as one symbol may be associated with a payout. Alternatively, two or more symbols may be used to form winning symbol combinations that result in a payout.

At block 371, the gaming system may update the player's gaming credit balance updated at block 327 in accordance with the payout amount determined at block 367, if any. In some implementations, the gaming system also updates the displayed credit balance to correspond to credit balance updated at block 371. In some implementations, the credit balance is not updated until a later time (e.g., after completion of the second feature of the game).

Figure 5:
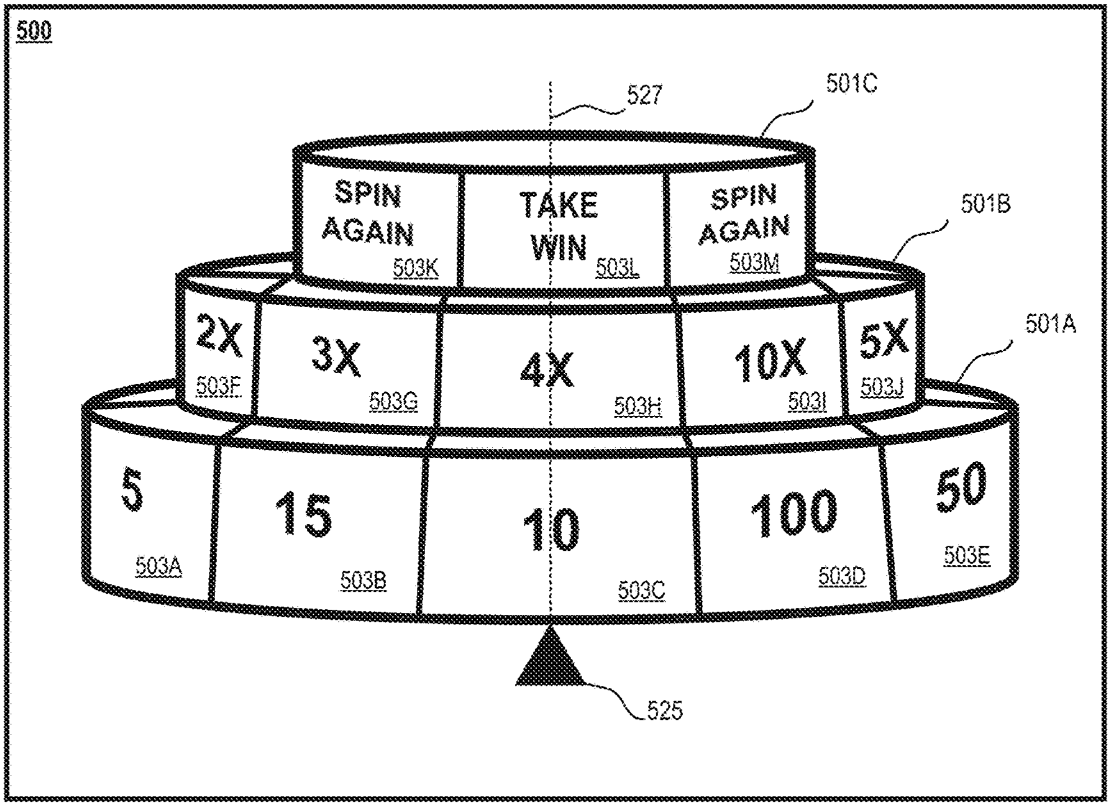
FIG. 5 shows a picture of a gaming system display illustrating an example of award wheels of a second feature in accordance with aspects of the present disclosure.

At block 375, the gaming system determines whether symbols displayed in the second feature outcome at block 359 include a terminator symbol, such as a "Game Over" symbol (e.g., terminator symbol 515 in FIG. 5). In implementations, one or more symbols sets corresponding to respective second feature outcome can include one or more terminator symbols that end play of the second feature of the game initiated at block 349. In other implementations, only one of the symbols sets includes terminator symbols that end play of the second feature. For example, where the second feature displays are award wheels, the symbol sets for one or more of the award wheels can include a "Game Over" symbol that, in some implementations, ends the second feature of the game or that, in other implementations, ends the game.

If the gaming system determines at block 379 that the second feature outcome at block 359 do not include a terminator symbol (e.g., block 379 is "No"), then the second feature of the game continues, and the method 300 iteratively returns to block 353, as indicated by off-page linking connector "E". If the gaming system determines at block 379 that the displayed symbols included in the second feature outcome at block 359 includes a terminator symbol (e.g., block 379 is "Yes"), then the second feature of the game ends.

In some implementations, at block 381, the gaming system determines whether a signal to end game play or "cash out" was received from a player input device of the gaming system (which would end the gaming session). If a cash out signal is not received (e.g., block 381 is "No"), then the method 300 iteratively returns to block 305 via off-page connector "B". On the other hand, if the gaming system received a cash out signal (e.g., block 381 is "Yes"), then at block 383, the gaming system dispenses a value to the player, through a value dispenser (e.g., using value dispenser 229) based on the player's gaming credit balance updated at block 371 and the method 300 ends.

FIG. 4 shows a picture of a game display 400 of a gaming system (e.g., gaming system 100) illustrating an example of initiator symbols and activator symbols of a first feature of the game. The example game display 400 represents a virtual video slot machine including five (5) reels 402A, 402B, 402C, 402D, and 402E (collectively, "reels 402"), three (3) pay lines 403A, 403B, and 403C (collectively, "pay lines 403"), and information areas and buttons 405A-405I (collectively, "information areas and buttons 405").

The reels 402 display one or more game symbols (e.g., 10, J, Q, K, A, Initiator, and Activator) using one or more symbol display areas 410. More specifically, the game display 400 includes symbol display areas (also referred to herein as symbol display positions) 410A, 410B, 410C, 410D, 410E, 410F, 410G, 410H, 410I, 410J, 410K, 410L, 410M, 410N, and 410O (collectively, "symbol display areas 410") that display selections of symbols randomly selected from one or more predefined symbol sets (e.g., game symbols 214). Reels 402 may display the game symbols that the gaming system selected (e.g., generated) from the sets of symbols in their respective symbol display areas 410. More specifically, the example shown in FIG. 4 arranges the, the symbol display areas 410 so as to provide the appearance of five game reels 402, the individual reels 402A, 402B, 402C, 402D, and 402E visibly show three symbols. For example, as shown in FIG. 4, symbol display areas 410A, 410F, and 410K are associated with reel 402A; symbol display areas 410B, 410G, and 410L are associated with reel 402*b*; symbol display areas 410C, 410H, and 410M are associated with reel 402C; and symbol display areas 410D, 410I, and 410N are associated with reel 402D; and symbol display areas 410E, 410J, and 410O are associated with reel 402E. The arrangement illustrated in the implementation of FIG. 4 thus creates a visible display area of the reels 402 comprising three visible symbol positions for each reel. When viewed together, reels 402 appear like a 3-row by 5-column reel array in display 400. In other implementations, smaller or larger visible areas of the reels can be displayed. During one play of a game, the gaming system may animate individual reels 402 to represent the reels spinning in one direction around a common axis so as to simulate the motion of slot machine reels. When the spinning stops, the gaming system may display the respective symbol displays 410 for the reels as being indexed with the pay lines 403, so as to simulate an outcome of a slot machine game.

The information areas and buttons 405 represent player interfaces devices (e.g., input device 115. In the present example, information area 405A illustrates an example value of one credit for the game displayed in game display 400. Credit meters 405B and 405C illustrate an example of the amount of the player's available credits. Information area 405D illustrates the amount of credits a player has won. Because FIG. 4 illustrates the start of a play of a game, the information area 405D shows zero credits have been won. Button 405E illustrates a software button that the player can select to place a bet or wager.

These information areas and buttons 405A-405I are illustrated in a particular arrangement for the sake of illustration. It is understood that the information areas and buttons 405A-405I may be rearranged in different implementations and may include more or fewer display areas and buttons 405A-405I than illustrated. It should be appreciated that the functionality of button 405E may also be replicated or replaced with a hardware button on the gaming system 100. Information area 405F illustrates that the player has selected to wager 400 credits. Button 405G illustrates a software button that the player can select to determine how many pay lines to wager on. It should be appreciated that the functionality of button 405G may also be replicated or replaced with a hardware button on the gaming system 100. Information area 405H illustrates that the player selected to wager on ten (10) pay lines. Button 405I illustrates a software button that the player can select to obtain information about the game, change certain aspects of the game, obtain help, place an order, etc.

FIG. 4 further illustrates one implementation of a gaming system executing an evaluation of the generated symbols on reels 402 for winning symbol combinations. In accordance with aspects of the present disclosure, the generated symbols can include an initiator symbol 420 and an activator symbol 425A and 425B (collectively, "activator symbols 425"). As previously described herein, in some implementations, when the gaming system displays an outcome including at least one initiator symbol 420 and at least one activator symbol 425 on the reels (e.g., symbol display areas 410) during play of a first feature of a game, the gaming device provides (e.g., triggers) a second feature (as shown, e.g., in FIG. 5). In such case, consistent with the process previously described (e.g., method 300), a count of the activator symbols 425 corresponding to the symbol display areas 410 (e.g., award wheels) of the second feature of the game would equal two (2) based on activator symbols 425A and 425B being displayed on reels 402E.

In some implementations, the gaming system provides the second feature of the game if an outcome of the first feature includes both the initiator symbol 420 and the at least one activator symbol 425 in predetermined locations of the display 400. For example, in some implementations, the gaming system triggers the second feature of the game if the initiator symbol 420 is displayed in reel 402A and if the at least one activator symbol 425 is displayed in reel 402E. In some other implementations, the gaming system triggers the second feature of the game if the initiator symbol 420 is displayed at a predetermined initiation position in symbol display area 410F and/or if the at least one activator symbol 425 is displayed at a predetermined activation position in symbol display area 410J.

Further, in some implementations, the gaming system triggers the second feature if the initiator symbol 420 and the at least one activator symbol 425 is displayed in a same pay line 403, such as initiator symbol 420 and activator symbol 425B in pay line 403B. In such case, consistent with the process previously described, a count of the activator symbols 425 corresponding to the symbol display areas (e.g., award wheels) of the second feature of the game would equal (1) based on activator symbol 425B being in the same pay line 403B as initiator 420, while activator symbols 425A would not be eligible in the count for the second feature of the game, as it is on a different pay lines 403A. Moreover, in some implementations, the gaming system triggers the second feature if the initiator symbol 420 and the at least one activator symbol 425 appear in the active pay lines of the display 400. For example, based on the player's wagers, pay lines 403A and 403B may be active, and pay line 403B may be inactive. In such case, the gaming system may trigger the second feature of the game if the initiator symbol 420 and at least one activator symbol 425 are displayed in the pay lines 403A and 403B. Accordingly, consistent with the process previously described, a count of the activator symbols corresponding to the second feature displays (e.g., award wheels) of the second feature of the game would equal two (2) based on activator symbols 425A and 425B being in the pay lines 403A and 404B.

It is understood that FIG. 4 illustrates one example implementation of a game display 400 that the gaming system 100 may display on a display device (e.g., display device 120) of the gaming system. It should be also appreciated that the game display 400 is merely representative and may have more or fewer game elements (e.g., reels, symbol display areas, symbols, etc.) shown in the game display 400. It is further understood that other games may be used for the first feature of the game. For example, the reels 402 may show fewer or a larger number of visible symbol display areas.

While symbol display areas 410 are illustrated with defined boxes, it should be appreciated that in some implementations, the defined boxes may not be visible to the player. It should also be appreciated that in some implementations, the symbol display areas 410 are other shapes or not defined shapes and may not be associated with reels. Further, it will be appreciated that other displays of the gaming system may be used (e.g., display device 130 and 134) to display game display 400. For example, in some implementations, the symbol display areas 410 may not be associated with reels 402. Also, the reels 402 may spin in different directions, rather than the same direction. As also illustrated in FIG. 4, the reels 402 are displayed substantially side by side. It is understood that the reels 402 can be displayed with any suitable amount of separation (e.g., less than two inches) or no separation.

In some implementations, the gaming system evaluates all symbols displayed in symbol display areas 410. However, in some implementations, the gaming system skips evaluating symbols that are not an initiator symbol 420 or an activator symbol 425 for the additional feature evaluation. By skipping evaluation of all of the displayed symbols, the efficiency of the gaming system can be improved because less memory and less processing power is used during the gaming system's evaluation for each round of the bonus game. This efficiency also translates into faster game play because less time is used to complete the game's evaluation. When such efficiency improvements are made and applied to the hundreds and thousands of game evaluations that are made on a casino floor for the disclosed gaming system, the new gaming system will provide casino game operators sizable gains in machine efficiency, which is a technological improvement.

FIG. 5 shows a picture of a gaming system display 500 illustrating an example of award wheels 501A, 501B, and 501C (collectively, "award wheels 501") in accordance with aspects of the present disclosure. More specifically, FIG. 5 illustrates a screen shot of one implementation of a gaming system (e.g., gaming system 100) providing layered award wheels 501 that can provide additional or enhanced awards to a player. FIG. 5 illustrates one implementation of a game display 500 that the gaming system may display on a display device of the gaming system (e.g., display device 120, 130 or 134).

The award wheels 501A, 501B, and 501C can be virtual award wheels or mechanical award wheels, wherein the individual wheels 501A, 501B, and 501C are respectively divided into a number of sections 503A-503E that display game symbols indicating various game results (e.g., award values, multiplier values, and game terminators). The wheels can be displayed in any suitable shape, such as, but not limited to cone shaped wheels, cylinder shaped wheels, etc. In some implementations, the award wheels 501 can be mapped to respective sets of symbols (e.g., game symbols 214). In some implementations, these respective sets of symbols for the award wheels 501 can be different from the sets of symbols for a first feature of the game, such as shown in FIG. 4. For example, the award wheel 501A can be a monetary award wheel mapped to a set of award value symbols, the award wheel 501B can be a modifier value wheel mapped to a set of award modifier symbols (e.g., award multipliers), and the award wheel 501C can be a terminator wheel mapped to a set of game symbols that includes a terminator symbol ("Take Win") or a continuation symbol ("Spin Again").

In accordance with implementations of the present disclosure the award wheels 501 are layered award wheels. More specifically, the number of award wheels may have a common central axis and can be stacked on top of one another with decreasing diameters. The decreasing diameters of the award wheels 501 can be arranged so as to visibly expose at least an annular portion of the respective sections 503 around the circumferences of the award wheels 501 as symbol display areas. During play of the second feature of the game, the award wheels may spin together for a period of time and come to rest (mechanically or virtually). An outcome of the second feature of the game may be indicated by a common index pointer 525 and/or index line 527. For example, in the example game display 500, an outcome may be a combination of a "10" value from award wheel 505A, a "4×" multiplier from award wheel 505B, and "Take Win" (e.g., a terminator symbol) from award wheel 505C. In some implementations, different award wheels may be assigned separate outcome indicators.

While FIG. 5 shows three award wheels 501A, 501B, 501C for the sake of simplicity, implementations consistent with the present disclosure can include a greater quantity or a fewer quantity of award wheels. Additionally, the quantity of award wheels displayed or activated can dynamically vary corresponding to quantity of activator symbols. For example, a quantity of activator symbols displayed in a first feature of the game (e.g., game display 400) comprising a 3×5 matrix (e.g., a five-reel slot machine) may range from 1 . . . 14 (excluding one displayed imitator symbol corresponding to the activation symbols). In accordance with such example, a number of award wheels 501 displayed or activated can vary from 1 . . . 14. It is understood that the quantity of potential award wheels 501 can be increased or decreased, for example, by varying the number of symbol display areas in a first feature of the game and/or by varying a number of a potential activator symbols included in the symbol set used in the first feature of the game.

In some implementations, the gaming system spins one or more of the award wheels 501 together. For example, if a first feature of the game includes one (1) activator symbols, the gaming system can spin award wheels 501A and 501C together. And, if the if a first feature of the game includes two (2) or more activator symbols, the gaming system can spin award wheels 501A, 501B, and 501C together.

In some implementations, the gaming system spins some or all of the award wheels 501 separately. For example, if a first feature of the game includes one (1) activator symbols, the gaming system can randomly select and spin one of award wheels 501A, 501B and 501C. Or, if the if a first feature of the game includes two (2) or more activator symbols, the gaming system can separately select and spin two of award wheels 501A, 501B, and 501C.

In some implementations, the gaming system spins the one or more of the award wheels after detecting a threshold number of activation symbols in activation positions in a first feature. For example, the gaming system may initiate one or more second feature displays in response to detecting a threshold of at least three (3) activator symbols are displayed in a single pay line of a first feature including five (5) symbols.

In some implementations, the maximum quantity of award wheels 505 is statically displayed by a display of the gaming system (e.g., display 130) and such award wheels are selective activated in the play of a second feature of the game based on the number activator symbols displayed in a first feature of the game. For example, active award wheels 505 can be lit, while inactive award wheels can be unlit.

In some implementations, the first feature and the second feature can be used together in a primary game. In some implementations, the first feature and the second feature can be used together in a bonus game.

Based on the forgoing description, it should be appreciated that a gaming system and method with improvements to game outcomes creates new and very exciting ways for a player to obtain improved winnings with a potential to earn greater awards. Such a potential to earn greater awards creates a greatly improved sense of anticipation for players.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein will be apparent to those skilled in the art from the foregoing descriptions. For example, while FIG. 1 illustrates only two private domains, it is understood that some embodiments can include three or more private domains with one or more users that are authenticated and authorized in each of the private domains. Such modifications and variations are intended to fall within the scope of the appended claims. The present disclosure is to be limited only by the terms of the appended claims, along with the full scope of equivalents to which such claims are entitled. It is also to be understood that the terminology used herein is for the purpose of describing particular embodiments only, and is not intended to be limiting.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B." In addition, where features or aspects of the disclosure are described in terms of Markush groups, those skilled in the art will recognize that the disclosure is also thereby described in terms of any individual member or subgroup of members of the Markush group.

A number of implementations of the invention have been described. Various modifications may be made without departing from the spirit and scope of the invention. For example, various forms of the flows shown above may be used, with steps re-ordered, added, or removed. Accordingly, other implementations are within the scope of the following claims.

I claim:

1. A gaming system comprising:

a cabinet;

one or more display devices supported by the cabinet;

a player input device supported by the cabinet;

a value acceptor supported by the cabinet;

a value dispenser supported by the cabinet;

a game controller supported by the cabinet and operably connected to the one or more display devices, the player input device, the value acceptor, the value dispenser, the game controller comprising a random number generator, a memory device, and a processor, wherein the memory device stores program instructions that, when executed by the processor, cause the gaming system to perform operations including:

receiving, by the value acceptor, a monetary value;

determining an amount of credit based on a monetary value received by the value acceptor;

receiving, via the player input device, a wager;

decreasing the amount of credit by the wager;

generating a plurality of first feature symbols by randomly selecting game symbols of one or more first feature symbol sets using the random number generator;

displaying, using the one or more display devices, the plurality of first feature symbols in one or more first symbol display areas;

determining that the plurality of first feature symbols includes an initiator symbol;

determining that the plurality of first feature symbols includes one or more activator symbols;

determining a quantity of the one or more activator symbols;

initiating one or more second feature displays based on the determining that the initiator symbol is included in the plurality of first feature symbols and the determining that the one or more activator symbols are included in the plurality of first feature symbols, wherein a quantity of the one or more second feature displays initiated corresponds to the quantity of the one or more activator symbols;

generating a plurality of second feature symbols by randomly selecting symbols of one or more second symbol sets using the random number generator, wherein one or more symbols or combinations of the symbols in the one or more second symbol sets correspond to one or more predetermined second awards;

displaying, using the one or more display devices, the plurality of second feature symbols;

determining that the displayed plurality of second feature symbols include at least one of the one or more symbols or the combinations of the symbols corresponding to one or more second feature awards;

converting the one or more of the second feature symbols or the one or more combinations of the second feature symbols into the one or more second feature awards;

displaying, using the one more display devices, the values of the one or more second feature awards;

determining a second feature continuation status by randomly selecting from one of the second symbol sets that include a continuation symbol and a terminator symbol;

updating the amount of the credit with the one or more second feature awards; and issuing another monetary value using the value dispenser based on the updated amount of the credit balance upon receipt of a cash out signal.

2. The gaming system of claim 1, wherein determining that the plurality of first feature symbols includes the initiator symbol comprises determining whether a predetermined initiation position of the one or more first symbol display areas includes the initiator symbol.

3. The gaming system of claim 1, wherein:

receiving the wager further comprises activating one or more pay lines of the one or more first symbol display areas based on an amount of the wager; and determining that the plurality of first feature symbols includes the initiator symbol comprises determining that one of the active pay lines includes the initiator symbol.

4. The gaming system of claim 1, wherein determining that the plurality of first feature symbols includes one or more activator symbols comprises determining whether a predetermined activation position among the one or more first symbol display areas includes one of the one or more activator symbols.

5. The gaming system of claim 1, wherein:

receiving the wager further comprises activating one or more pay lines of the one or more first symbol display areas based on an amount of the wager; and determining that the plurality of first feature symbols includes one or more activator symbols comprises determining that one of the active pay lines includes one of the one or more activator symbols; and determining the quantity of the one or more activator symbols comprises determining a quantity of the one or more activator symbols included in the active pay lines.

6. The gaming system of claim 1, wherein:

the one or more second feature displays comprises a plurality of second feature displays statically displayed by a second display device of the one or more display devices; and initiating the one or more second feature displays comprises selectively activating a quantity of the plurality of second feature displays equal to the quantity of the one or more activator symbols.

7. The gaming system of claim 1, wherein the one or more second feature displays comprise one or more award wheels including a plurality of sections, wherein individual sections of the plurality of sections display a respective one of the plurality of second feature symbols.

8. The gaming system of claim 7, wherein the one or more award wheels comprise one or more award wheels and a terminator wheel, wherein:

the plurality of second feature symbols displayed on the one or more award wheels comprise award values or award value modifiers; and the plurality of second feature symbols displayed on the terminator wheel comprise one or more game terminating symbols that terminate play of a game.

9. The gaming system of claim 7, wherein the one or more award wheels are stacked and configured to rotate around a common central axis.

10. The gaming system of claim 1, wherein initiating the one or more second feature displays comprises activating a bonus game without receiving an additional wager.

11. A method of operating a gaming system comprising:

receiving, by a value acceptor, a monetary value;

determining, by a processor, an amount of credit of a player based on a monetary value received by the value acceptor;

receiving, by the processor via the player input device, a wager;

decreasing, by the processor, the amount of credit by the wager;

generating, by the processor, a plurality of first feature symbols by randomly selecting game symbols of one or more first feature symbol sets using the random number generator;

displaying, by the processor using a one or more display devices, the plurality of first feature symbols in one or more first symbol display areas;

determining, by the processor, that the plurality of first feature symbols includes an initiator symbol;

determining, by the processor, that the plurality of first feature symbols includes one or more activator symbols;

determining, by the processor, a quantity of the one or more activator symbols;

initiating, by the processor, one or more second feature displays based on the determination that the initiator symbol is included in the plurality of first feature symbols and the determination that the one or more activator symbols are included in the plurality of first feature symbols, wherein a quantity of the one or more second feature displays initiated corresponds to the quantity of the one or more activator symbols;

generating, by the processor, a plurality of second feature symbols by randomly selecting symbols of one or more second symbol sets using the random number generator, wherein one or more symbols or combinations of the symbols in the one or more second symbol sets correspond to one or more predetermined second awards;

displaying, by the processor using the one or more display devices, the plurality of second feature symbols;

determining, by the processor, that the displayed plurality of second feature symbols include at least one of the one or more symbols or the combinations of the symbols corresponding to one or more second feature awards;

converting, by the processor, the one or more of the second feature symbols or the one or more combinations of the second feature symbols into the one or more second feature awards;

displaying, by the processor using the one more display devices, the values of the one or more second feature awards;

determining a second feature continuation status by randomly selecting from one of the second symbol sets that include a continuation symbol and a terminator symbol;

updating the amount of the credit with the one or more second feature awards; and issuing, by the processor using the value dispenser, another monetary value based on the updated amount of the credit balance upon receipt of a cash out signal.

12. The method of claim 11, wherein determining that the plurality of first feature symbols includes the initiator symbol comprises determining whether a predetermined initiation position of the one or more first symbol display areas includes the initiator symbol.

13. The method of claim 11, wherein:

receiving the wager further comprises activating one or more pay lines of the one or more first symbol display areas based on an amount of the wager; and determining that the plurality of first feature symbols includes the initiator symbol comprises determining that one of the active pay lines includes the initiator symbol.

14. The method of claim 11, wherein determining that the plurality of first feature symbols includes one or more activator symbol comprises determining whether a predetermined activation position among the one or more first symbol display areas includes one of the one or more activator symbols.

15. The method of claim 11, wherein:

receiving the wager further comprises activating one or more pay lines of the one or more first symbol display areas based on an amount of the wager; and determining that the plurality of first feature symbols includes one or more activator symbols comprises determining that one of the active pay lines includes one of the one or more activator symbols; and determining the quantity of the one or more activator symbols comprises determining a quantity of the one or more activator symbols included in the active pay lines.

16. The method of claim 11, wherein:

the one or more second feature displays comprises a plurality of second feature displays statically displayed by a second display device of the one or more display devices; and initiating the one or more second feature displays comprises selectively activating a quantity of the plurality of second feature displays equal to the quantity of the one or more activator symbols.

17. The method of claim 11, wherein the one or more second feature displays comprise one or more award wheels including a plurality of sections, wherein individual sections of the plurality of sections display a respective one of the plurality of second feature symbols.

18. The method of claim 17, wherein the one or more award wheels comprise one or more award wheels and a terminator wheel, wherein:

the plurality of second feature symbols displayed on the one or more award wheels comprise award values or award value modifiers; and the plurality of second feature symbols displayed on the terminator wheel comprise one or more game terminating symbols that terminate play of a game.

19. The method of claim 18, wherein the one or more award wheels are stacked and configured to rotate around a common central axis.

20. A computer program product comprising non-transitory computer-readable device storing program instructions that, when executed by a processor of a gaming system, cause the gaming to perform operations, the operations comprising:

receiving, by a value acceptor, a monetary value;

determining, by a processor, an amount of credit of a player based on a monetary value received by the value acceptor;

receiving, by the processor via the player input device, a wager;

decreasing, by the processor, the amount of credit by the wager;

generating, by the processor, a plurality of first feature symbols by randomly selecting game symbols of one or more first feature symbol sets using the random number generator;

displaying, by the processor using a one or more display devices, the plurality of first feature symbols in one or more first symbol display areas;

determining, by the processor, that the plurality of first feature symbols includes an initiator symbol;

determining, by the processor, that the plurality of first feature symbols includes one or more activator symbols;

determining, by the processor, a quantity of the one or more activator symbols;

initiating, by the processor, one or more second feature displays based on the determination that the initiator symbol is included in the plurality of first feature symbols and the determination that the one or more activator symbols are included in the plurality of first feature symbols, wherein a quantity of the one or more second feature displays initiated corresponds to the quantity of the one or more activator symbols;

generating, by the processor, a plurality of second feature symbols by randomly selecting symbols of one or more second symbol sets using the random number generator, wherein one or more symbols or combinations of the symbols in the one or more second symbol sets correspond to one or more predetermined second awards;

displaying, by the processor using the one or more display devices, the plurality of second feature symbols;

determining, by the processor, that the displayed plurality of second feature symbols include at least one of the one or more symbols or the combinations of the symbols corresponding to one or more second feature awards;

converting, by the processor, the one or more of the second feature symbols or the one or more combinations of the second feature symbols into the one or more second feature awards;

determining a second feature continuation status by randomly selecting from one of the second symbol sets that include a continuation symbol and a terminator symbol;

displaying, by the processor using the one more display devices, the values of the one or more second feature awards;

updating the amount of the credit with the one or more second feature awards; and issuing, by the processor using the value dispenser, another monetary value based on the updated amount of the credit balance upon receipt of a cash out signal.

* * * * *